(12) United States Patent
Huang et al.

(10) Patent No.: US 12,282,184 B1
(45) Date of Patent: Apr. 22, 2025

(54) REFLECTORS APPLIED TO PHOTONICS PLATFORMS

(71) Applicant: Taiwan Semiconductor Manufacturing Co., Ltd., Hsinchu (TW)

(72) Inventors: Tai-Chun Huang, New Taipei (TW); Stefan Rusu, Sunnyvale, CA (US)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 18/778,773

(22) Filed: Jul. 19, 2024

(51) Int. Cl.
*F21V 8/00* (2006.01)
*G02B 6/02* (2006.01)

(52) U.S. Cl.
CPC ........... *G02B 6/0055* (2013.01); *G02B 6/021* (2013.01); *G02B 6/02123* (2013.01)

(58) Field of Classification Search
CPC ... G02B 6/0055; G02B 6/021; G02B 6/02123
See application file for complete search history.

(56) References Cited

U.S. PATENT DOCUMENTS

| 11,435,528 B1 * | 9/2022 | Gao | G02B 6/34 |
| 2011/0038588 A1 * | 2/2011 | Kim | G02B 6/124 |
| | | | 385/131 |
| 2024/0272366 A1 * | 8/2024 | Chandran | G02B 6/30 |

* cited by examiner

*Primary Examiner* — Joseph L Williams
(74) *Attorney, Agent, or Firm* — Slater Matsil, LLP

(57) ABSTRACT

A method of forming an optical device is provided that can include forming a backside reflector layer, and forming a cladding layer on the backside reflector layer. The method can further include forming a grating layer on the cladding layer, and forming a receiving reflector layer on the cladding layer. The receiving reflector layer can include an opening for receiving optical signal to at least the grating layer.

20 Claims, 20 Drawing Sheets

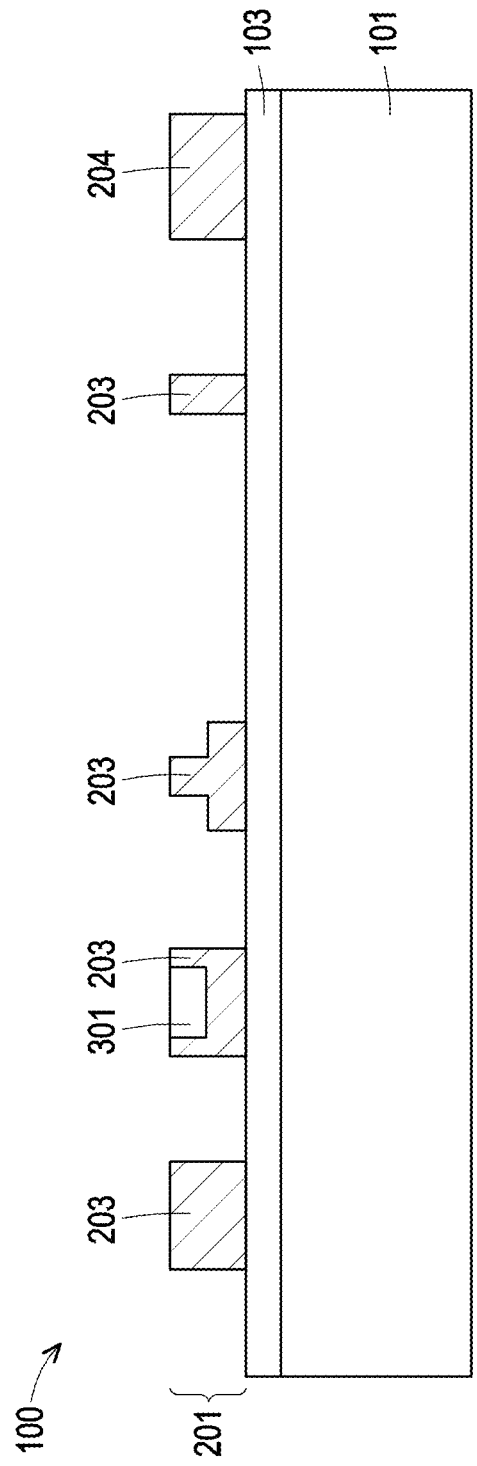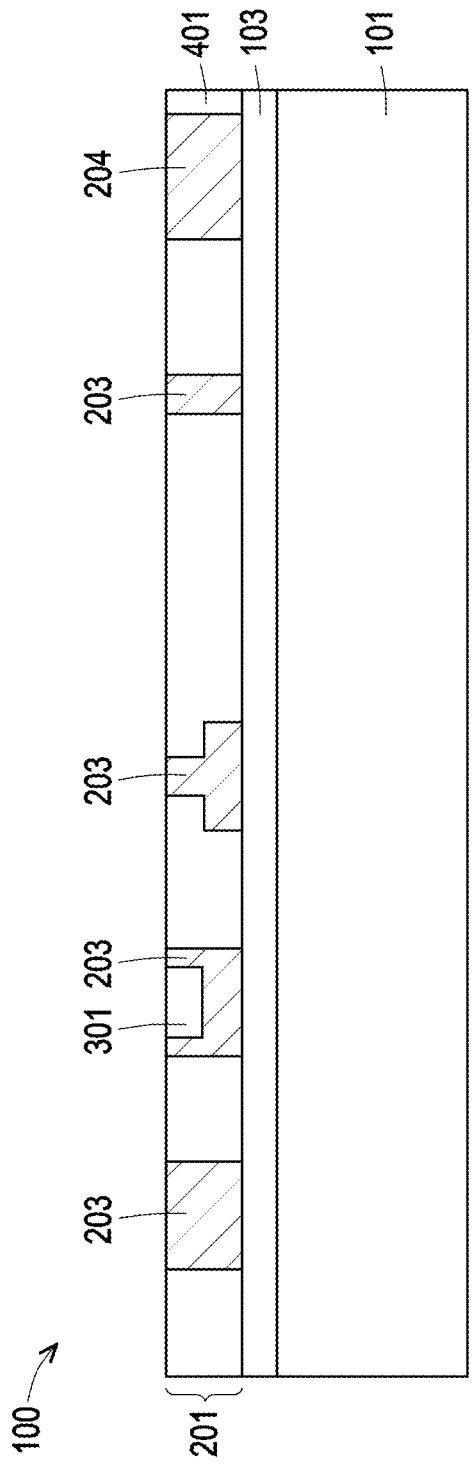

REFLECTORS APPLIED TO PHOTONICS PLATFORMS

BACKGROUND

Electrical signaling and processing is one technique for signal transmission and processing. Optical signaling and processing have been used in increasingly more applications in recent years, particularly due to the use of optical fiber-related applications for signal transmission. Grating couplers are one type of device that can provide for the coupling of optical signals from an optical fiber to an optical waveguide for use in optical signaling and processing systems. However, existing grating couplers are often associated with energy losses, which in turn affect the overall system performance.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3-9 are side cross-sectional views illustrating the formation of a photonics platform integrating a grating coupler as described in FIGS. 2A-2M, in accordance with some embodiments.

DETAILED DESCRIPTION

Figure 1:
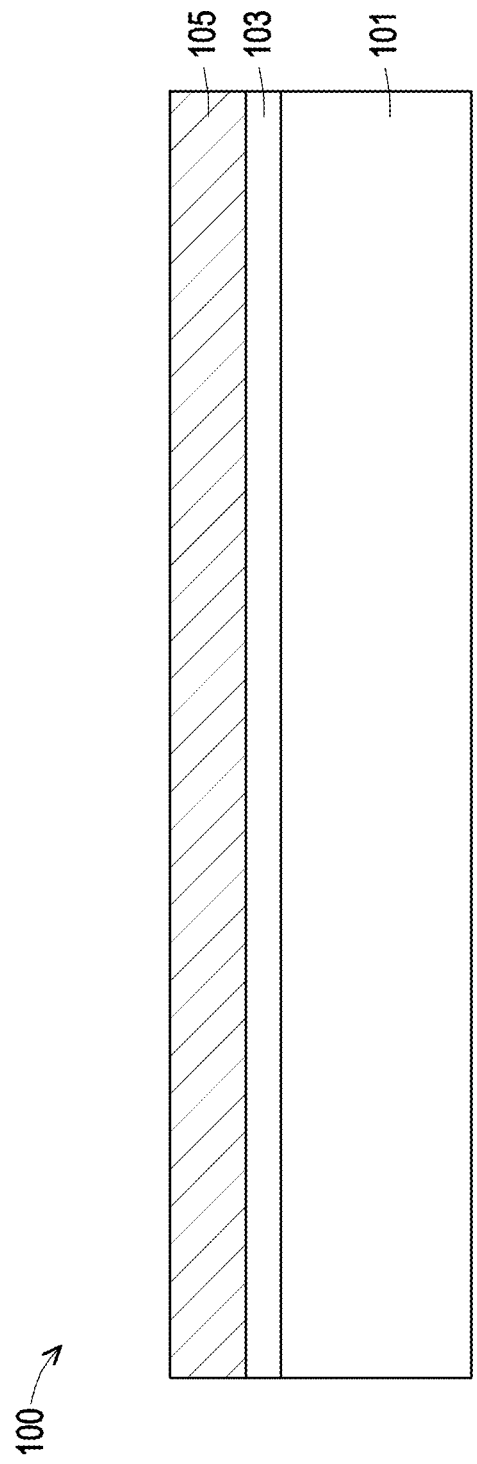
FIG. 1 is a side cross-sectional view illustrating an interposer used in a method for forming a photonics platform, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, the structures and methods described herein provide an optical structure including dual-layer metal reflection layers. In some embodiments, the optical structure includes a receiving reflection layer having an opening present there through for receiving optical signal from an optical fiber transmission to a grating structure of the optical device. In some embodiments, the dual-layer metal reflection layers for the optical device further includes a backside reflection layer on an opposing side of the grating structure that receiving reflection layers including the hole structure is present on.

The embodiments presented herein are intended to be illustrative and are not intended to limit the embodiments to the precise descriptions as discussed. Rather, the embodiments discussed may be incorporated into a wide variety of implementations, and all such implementations are fully intended to be included within the scope of the embodiments.

With reference now to FIG. 1, there is illustrated an initial structure of an optical interposer 100. In the particular embodiment illustrated in FIG. 1, the optical interposer 100 is a photonic integrated circuit (PIC) and comprises at this stage a first substrate 101, a first insulator layer 103, and a layer of material 105 for a first active layer 201 of first optical components 203 (not separately illustrated in FIG. 1 but illustrated and discussed further below with respect to FIG. 2). In an embodiment, at a beginning of the manufacturing process of the optical interposer 100, the first substrate 101, the first insulator layer 103, and the layer of material 105 for the first active layer 201 of the first optical components 203 may collectively be part of a silicon-on-insulator (SOI) substrate. Looking first at the first substrate 101, the first substrate 101 may be a semiconductor material such as silicon or germanium, a dielectric material such as glass, or any other suitable material that allows for structural support of overlying devices.

The first insulator layer 103 may be a dielectric layer that separates the first substrate 101 from the overlying first active layer 201 and can additionally, in some embodiments, serve as a portion of cladding material that surrounds the subsequently manufactured first optical components 203 (discussed further below). In an embodiment the first insulator layer 103 may be silicon oxide, silicon nitride, germanium oxide, germanium nitride, combinations of these, or the like, formed using a method such as implantation (e.g., to form a buried oxide (BOX) layer) or else may be deposited onto the first substrate 101 using a deposition method such as chemical vapor deposition, atomic layer deposition, physical vapor deposition, combinations of these, or the like. However, any suitable material and method of manufacture may be used.

The material 105 for the first active layer 201 is initially (prior to patterning) a conformal layer of material that will be used to begin manufacturing the first active layer 201 of the first optical components 203. In an embodiment, the material 105 for the first active layer 201 may be a translucent material that can be used as a core material for the desired first optical components 203, such as a semiconductor material such as silicon, germanium, silicon germanium, combinations of these, or the like, while in other embodiments the material 105 for the first active layer 201 may be a dielectric material such as silicon nitride or the like, although in other embodiments the material 105 for the first active layer 201 may be III-V materials, lithium niobate materials, or polymers. In embodiments in which the material 105 of the first active layer 201 is deposited, the material 105 for the first active layer 201 may be deposited using a method such as epitaxial growth, chemical vapor deposition, atomic layer deposition, physical vapor deposition, combinations of these, or the like. In other embodiments in which the first insulator layer 103 is formed using an implantation method, the material 105 of the first active layer 201 may initially be part of the first substrate 101 prior to the implantation process to form the first insulation layer 103. However, any suitable materials and methods of manufacture may be utilized to form the material 105 of the first active layer 201.

Figure 2:
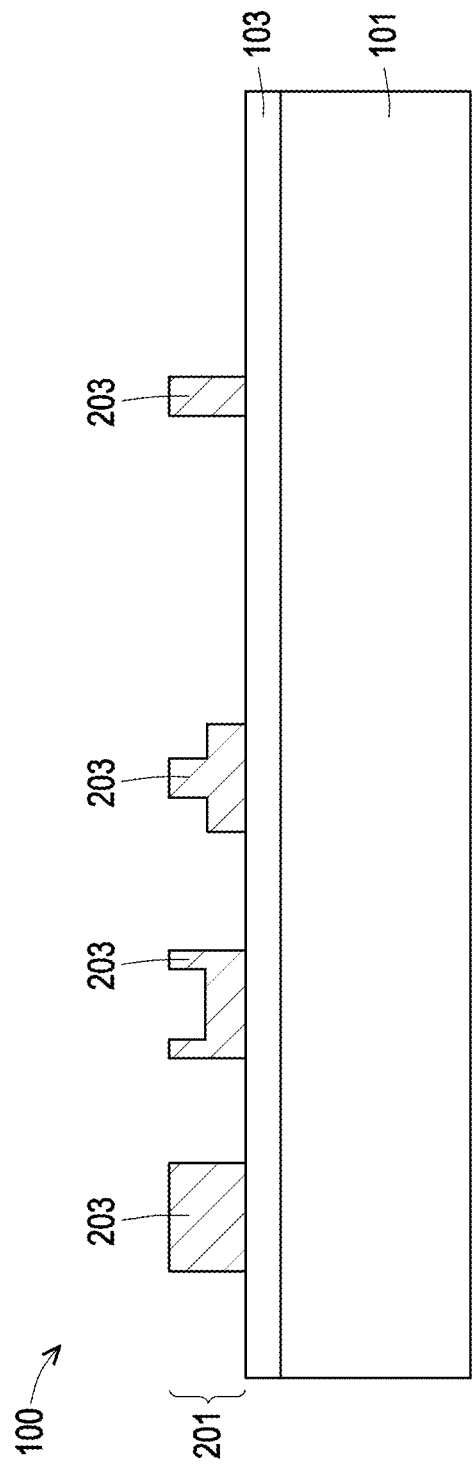
FIG. 2 is a side cross-sectional view illustrating processing the interposer to provide first optical devices, in accordance with some embodiments.

FIG. 2 illustrates that, once the material 105 for the first active layer 201 is ready, the first optical components 203 for the first active layer 201 are manufactured using the material 105 for the first active layer 201. In embodiments the first optical components 203 of the first active layer 201 may include such components as optical waveguides (e.g., ridge waveguides, rib waveguides, buried channel waveguides, diffused waveguides, etc.), directional couplers, optical modulators (e.g., Mach-Zehnder silicon-photonic switches, microelectromechanical switches, micro-ring resonators, etc.), amplifiers, multiplexors, demultiplexors, optical-to-electrical converters (e.g., P-N junctions), electrical-to-optical converters, lasers, combinations of these, or the like. However, any suitable first optical components 203 may be used.

To begin forming the first active layer 201 of the first optical components 203 from the initial material, the material 105 for the first active layer 201 may be patterned into the desired shapes for the first active layer 201 of first optical components 203. In an embodiment the material 105 for the first active layer 201 may be patterned using, e.g., one or more photolithographic masking and etching processes. However, any suitable method of patterning the material 105 for the first active layer 201 may be utilized. For some of the first optical components 203, the patterning process may be all or at least most of the manufacturing that is used to form these first optical components 203.

In some embodiments, a portion of the interposer 100 may be processed to provide a grating coupler 204 (as seen in FIG. 3). The portion of the interposer 100 that is processed to provide the grating coupler 204 is hereafter referred to as the grating coupler portion 205 of the interposer 100. In some embodiments, to protect the first optical components 203 during the processing used for forming the grating coupler 204, the portions of the interposer 100 that the first optical components 203 are present in is covered with a masking structure. In some embodiments, the masking structure is patterned to provide that the grating coupler portion 205 of the interposer 100 is exposed. The masking structure which protects the first optical components 203 from the processes used to form the grating coupler 204 may be a hardmask, photoresist mask or a combination of a photoresist mask and hardmask. The masking structure used to isolate the grating coupler portion 205 of the interposer may be removed following completion of the grating coupler 204.

Figure 2A:
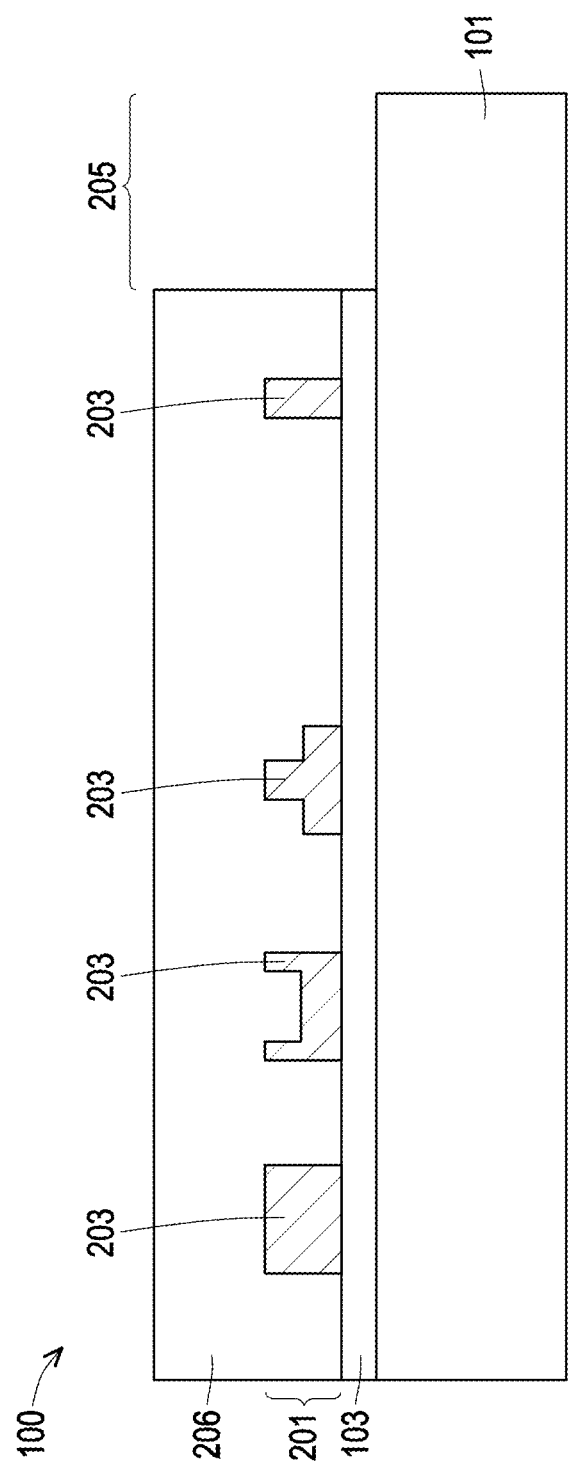
FIG. 2A is a side cross-sectional view illustrating forming masking to isolate a grating coupler portion of the interposer and removing a first insulating layer of the interposer in the grating coupler portion, in accordance with some embodiments.

FIG. 2A illustrates one embodiment of forming a first mask 206 to protect the first optical components 203 and expose the grating coupler portion 205 of the interposer 100. Following the formation of the first mask 206, an etch process may be used to remove any portion of the first active layer 105 and the first insulating layer 103 that may be present in the grating coupler portion 205 of the interposer 100. The etch process used at this stage of the process flow may be an anisotropic etch, such as reactive ion etching (RIE). In some embodiments, the etch process that is used to remove the first insulating layer 103 may include an etch chemistry that is selective to the first substrate 101. Following removing the first insulating layer 103, the upper surface of the first substrate 101 may be exposed.

FIG. 2B-2F illustrate one embodiment of processing the grating coupler portion 205 of interposer 100 to form a grating coupler 204 atop the first substrate 101 that includes a single layer grating structure 211. In some embodiments, the grating coupler that is depicted being formed by the process flow illustrated in FIGS. 2B-2F is an optical device that includes a backside reflector layer 260, a first cladding layer 103A on the backside reflector layer 260, a single layer grating structure 211 on the backside reflector layer 260, and a receiving reflector layer 265 on the single layer grating structure 211 (seen in FIG. 2E). In some embodiments, the receiving reflector layer 265 includes an opening 270 for receiving optical signal to at least the single layer grating structure 211 (Seen in FIG. 2E). During the processing of the grating coupler portion 205 that is depicted in FIGS. 2B-2F, the remaining portions of the interposer 100 including the first optical components 203 may be protected by one or more block masks and/or hard masks.

Figure 2B:
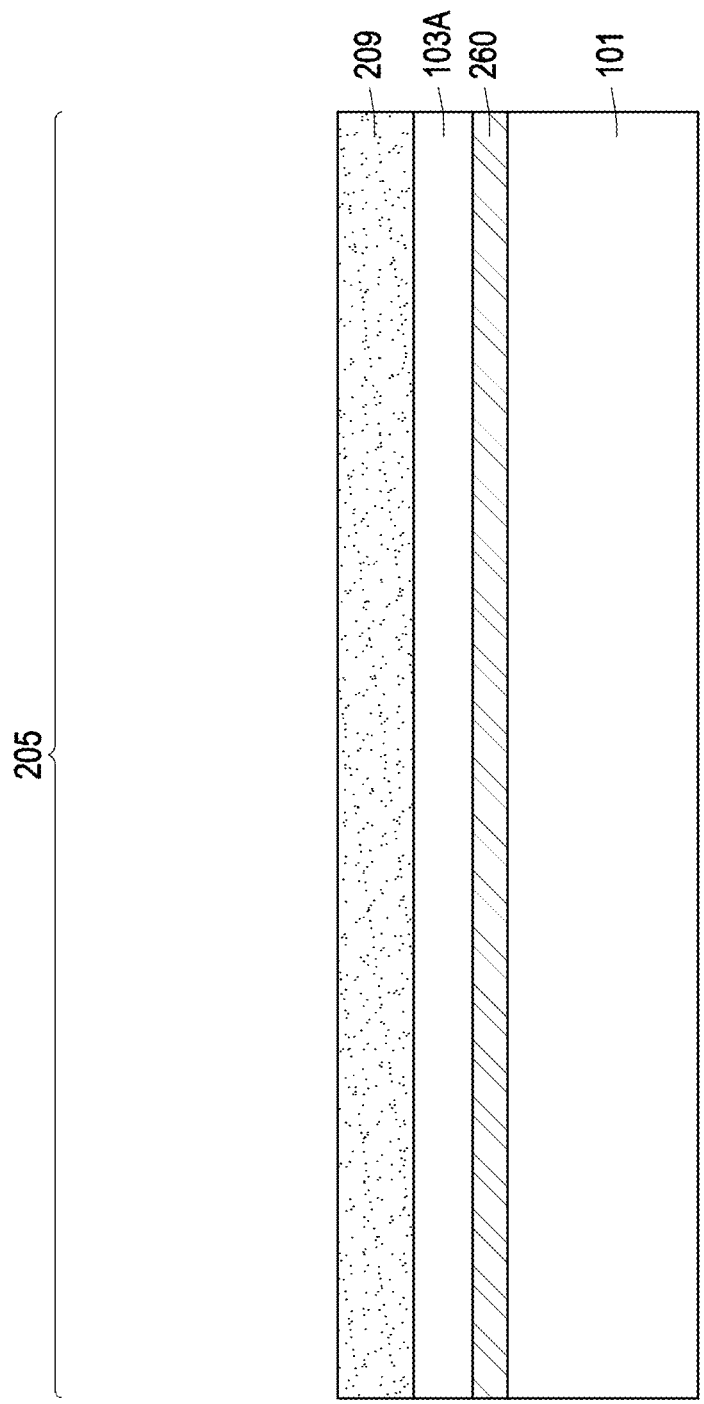
FIG. 2B is a side cross-sectional view illustrating forming a backside reflector layer, a first cladding layer and the single material layer for a single layer grating structure in the grating coupler portion of the interposer, in accordance with some embodiments.

FIG. 2B illustrates an embodiment of forming a backside reflector layer 260 on the upper surface of the first substrate 101 that is present in the grating coupler portion 205. The backside reflector layer 260 is an element of the dual-layer metal reflection layers that can increase the number of reflections for the optical signal being received by the optical device. In some embodiments, the backside reflector layer 260 allows for the bottom-reflected optical signal that is reflected off the backside reflection layer to be coupled back into the grating structure through a reflection mechanism. The backside reflector layer 260 may also be referred to a mirror layer, e.g., a backside mirror layer. In some embodiments, the backside reflector layer 260 can also be a distributed Bragg reflector.

In some embodiments, the backside reflector layer 260 may be composed of a metal containing composition material. For example, the backside reflector layer 260 may be composed of a metal, such as gold (Au), silver (Ag), copper (Cu), tin (Sn), aluminum (Al), tungsten (W), tantalum (Ta), platinum (Pt) and alloys thereof. In some embodiments, forming the backside reflector layer 260 may begin with depositing a seed layer. For example, the seed layer may comprise a copper layer. The seed layer may be deposited using processes such as sputtering, evaporation, or plasma-enhanced chemical vapor deposition (PECVD), or the like, depending upon the desired materials. The backside reflector layer 260 may then be plated on the seed layer. The plate metal for the backside reflector layer 260 may be deposited over the seed layer through a plating process such as electrical or electro-less plating. It is noted that methods and compositions for the backside reflector layer 260 are provided for illustrative purposes only and are not intended to limit the disclosure to only the material and methods described above. Other compositions and methods for the backside reflector layer 260 are also within the scope of the present disclosure, so long as the backside reflector layer 260 being formed is an optical signal reflecting structure. For example, the backside reflector layer 260 may be formed using backside processing at a later point of the process flow, e.g., following formation of the grating structures.

FIG. 2B also illustrates forming a first cladding layer 103A on the backside reflector layer 260. The first cladding layer 103A may be composed of an oxide containing material composition, such as silicon oxide ($SiO_2$). The first cladding layer 103A may be deposited using a chemical vapor deposition (CVD) process. It is noted that chemical vapor deposition (CVD) is only one example of a deposition process that is suitable for forming the first cladding layer 103A. In other examples, the first cladding layer 103A may be formed using a deposition process, such as atomic layer deposition (ALD) or physical vapor deposition (PVD). Further, the composition of the first cladding layer 103A is not limited to only silicon oxide. For example, in addition to silicon oxide, the first cladding layer 103A may also be composed of silicon nitride, germanium oxide, germanium nitride, and combinations thereof.

FIG. 2B also illustrates forming the single material layer 209 for the single layer grating structure 211. The single material layer 209 can be formed in direct contact with an upper surface of the first cladding layer 103A using a single deposition step. In some embodiments, the single material layer 209 for the single layer grating structure 211 may be composed of a semiconductor containing material, such as a silicon containing material, e.g., silicon (Si). In some embodiments, the single material layer 209 may be composed of a dielectric material, such as a nitride containing material, e.g., silicon nitride ($Si_3N_4$). In some embodiments, the single material layer 209 may be deposited using a chemical vapor deposition (CVD) process. In one example, the chemical vapor deposition (CVD) process may be plasma enhanced chemical vapor deposition (PECVD). In other examples, the single material layer 209 may be deposited using high density plasma chemical vapor deposition (HDPCVD), atomic layer deposition (ALD) or physical vapor deposition (PVD).

Figure 2C:
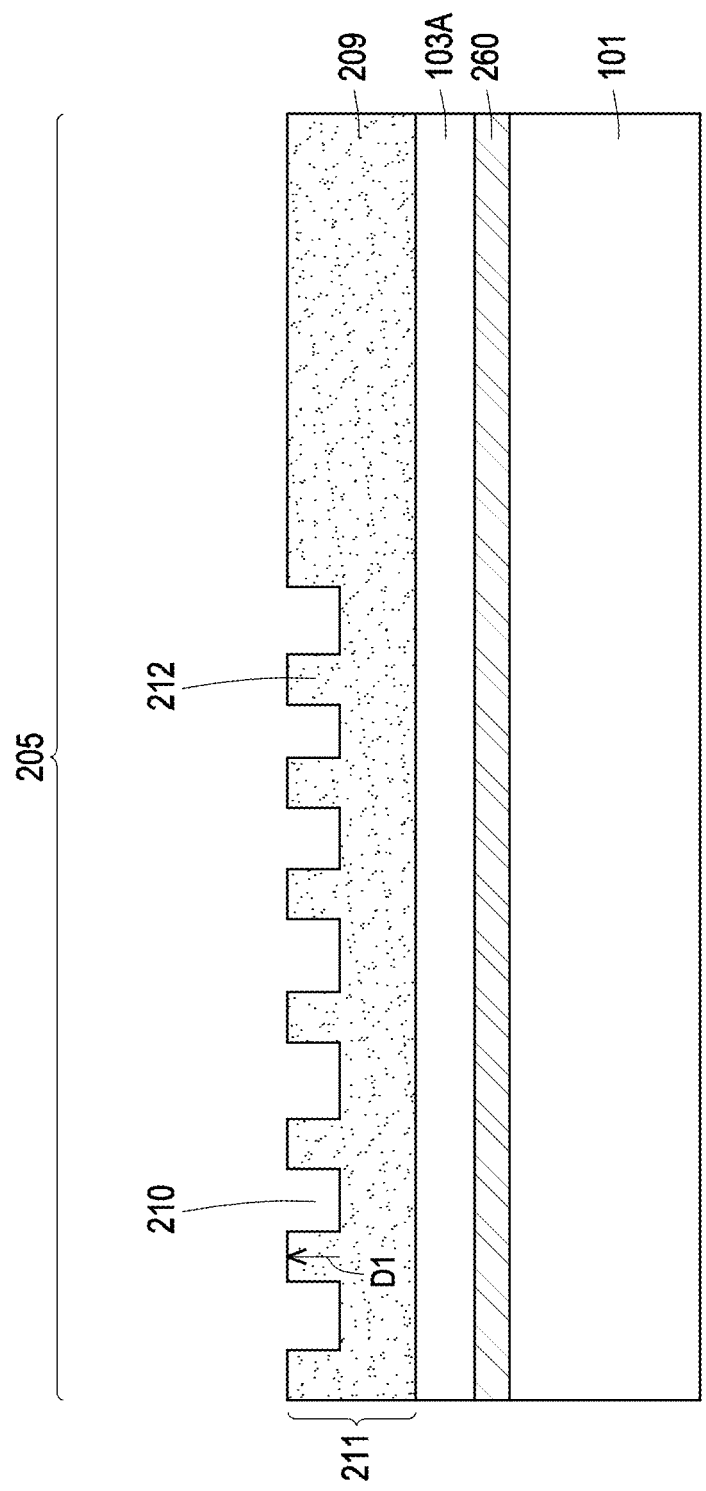
FIG. 2C is a side cross-sectional view illustrating forming a set of gratings on an upper surface of the single material layer for the single layer grating structure, in accordance with some embodiments.

FIG. 2C illustrates an embodiment of forming a set of gratings 212 on an upper surface of the single material layer 209 for the single layer grating structure 211. In some embodiments, the set of gratings 212 may be formed by forming trenches 210 into the upper surface of the single material layer 209. Forming the trenches 210 into the upper surface of the single material layer 209 may include an etch process. For example, the etch process for forming the trenches 210 can include forming an etch mask that is patterned to expose the portions of the single material layer 209 that are to be etched to form the trenches 210. The portions of the single material layer 209 that are protected by the etch mask and between each pair of trenches 210 provide the set of gratings 212 following the etch step that forms the trenches 210. In some embodiments, the etch process for forming the trenches 210 may be an anisotropic etch, i.e., directional etch, such as reactive ion etching (RIE). The set of gratings 212 depicted in FIG. 2C have a height that extends in a direction D1 towards the subsequently formed receiving reflector layer 265 (as seen in FIG. 2e).

In some embodiments, the height of the set of gratings 212 may be adjusted to provide for coupling with different wavelengths of light. In some examples, the height of the set of gratings 212 may be varied by changing the etch depth for the trenches 210. To vary the etch depth of the trenches 210, one or more etch masks and etch processes may be applied in which the etch time is varied to vary the different etch depths. In further embodiments, the etch processes may be accompanied with an ion implantation process that can change the etch rate of the material being etched. In other examples, the height of the gratings may be varied by recessing the upper surfaces of the gratings themselves, which can also be achieved using multiple mask and etch steps.

Figure 2D:
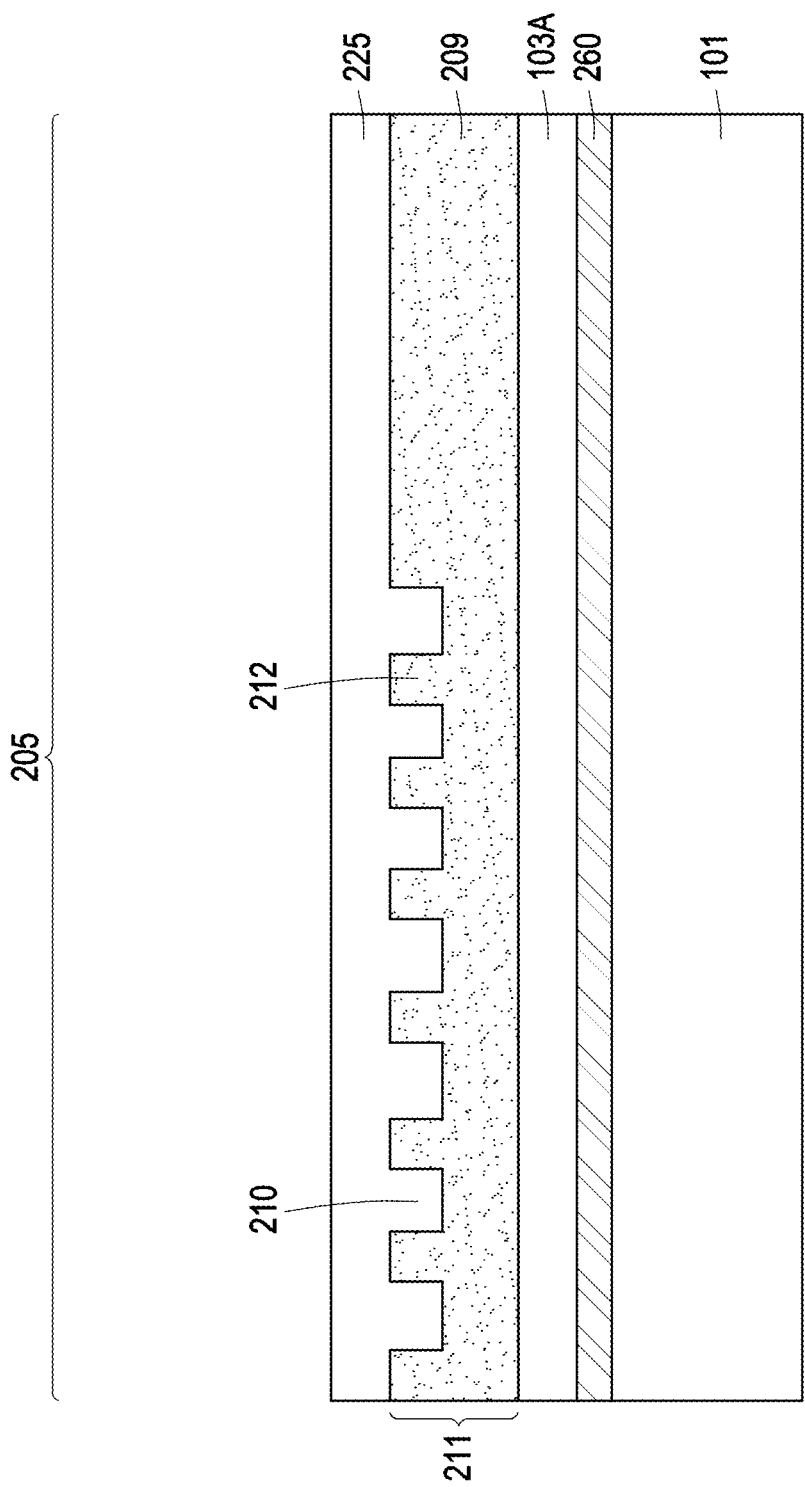
FIG. 2D is a side cross-sectional view illustrating forming a second cladding layer on the single layer grating structure, in accordance with some embodiments.

FIG. 2D illustrates forming a second cladding layer 225 on the surface of the single material layer 209 for the single layer grating structure 211 that includes the set of gratings 212. The second cladding layer 225 may be composed of an oxide containing material composition, such as silicon oxide ($SiO_2$). The second cladding layer 225 may also be composed of silicon nitride, germanium oxide, germanium nitride, and combinations thereof. The second cladding layer 225 may be deposited using a chemical vapor deposition (CVD) process. It is noted that chemical vapor deposition (CVD) is only one example of a deposition process that is suitable for forming the second cladding layer 225. In other examples, the second cladding layer 225 may be formed using a deposition process, such as atomic layer deposition (ALD) or physical vapor deposition (PVD).

Figure 2E:
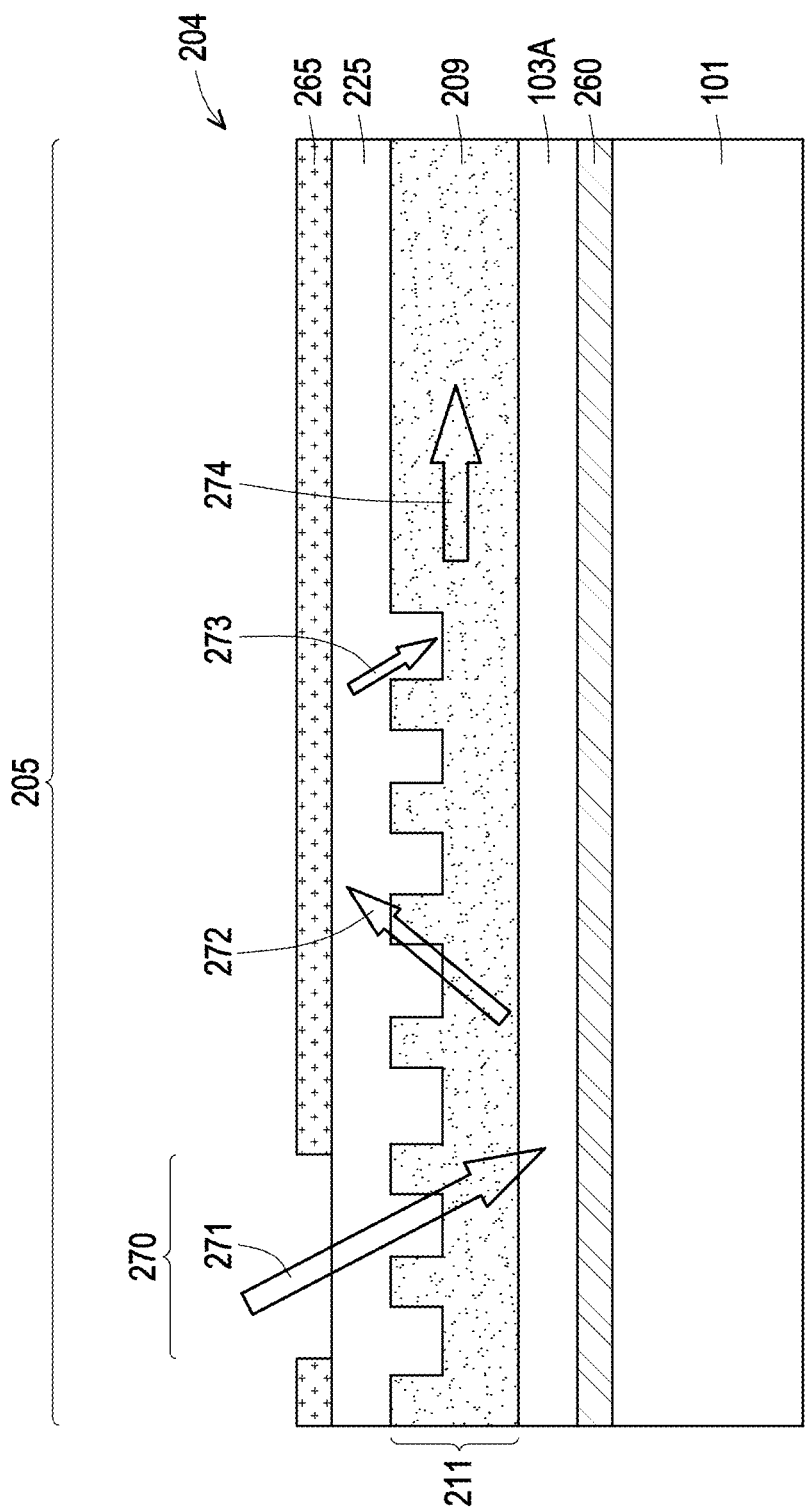
FIG. 2E is a side cross-sectional view illustrating forming a receiving reflector layer on the second cladding layer, wherein the receiving reflector layer includes an opening for receiving optical signal to at least the single grating layer structure, in accordance with some embodiments.

FIG. 2E illustrates forming a receiving reflector layer 265 on the second cladding layer 225. In some embodiments, the receiving reflector layer 265 includes an opening 270 for receiving optical signal to at least the single layer grating structure 211. The receiving reflector layer 265 is an element of the dual-layer metal reflection layers that can increase the number of reflections for the optical signal being received by the optical device. The optical device including the dual-layer metal reflection layers and grating structure provides a grating coupler that can effectively confine and concentrate optical signals. For example, the opening 270 (also referred to as hole structure) that is present through the receiving reflection layer 265 can effectively concentrate the optical signal at the entrance to the grating structure portion of the grating coupler, thereby improving the coupling and collection efficiency of optical signals. Additionally, in some embodiments, by using the mechanism of multiple reflections, the bottom-reflected optical signals that are reflected off the backside reflector layer 260 can be guided back and coupled into the grating coupler, further enhancing the coupling efficiency. The receiving reflector layer 265 may also be referred to as a mirror layer, e.g., a receiving mirror layer. The receiving reflector layer 265 can be a distributed Bragg reflector.

In some embodiments, the receiving reflector layer 265 may be composed of a metal containing composition material. For example, the receiving reflector layer 265 may be composed of a metal, such as gold (Au), silver (Ag), copper (Cu), tin (Sn), aluminum (Al), tungsten (W), tantalum (Ta), platinum (Pt) and alloys thereof. In some embodiments, forming the receiver reflector layer 265 may begin with depositing a seed layer. For example, the seed layer may comprise a copper layer. The seed layer may be deposited using processes such as sputtering, evaporation, or plasma-enhanced chemical vapor deposition (PECVD), or the like, depending upon the desired materials. The receiver reflector layer 265 may then be plated on the seed layer. The plate metal for the receiver reflector layer 265 may be deposited over the seed layer through a plating process such as electrical or electro-less plating. It is noted that methods and compositions for the receiver reflector layer 265 are provided for illustrative purposes only and are not intended to limit the disclosure to only the material and methods described above. Other compositions and methods for the receiver reflector layer 265 are also within the scope of the present disclosure, so long as the receiver reflector layer 265 being formed is an optical signal reflecting structure.

Following forming the material layer for the receiving reflector layer 265, an opening 270 through the receiving reflector layer 265 may be formed for receiving optical signals, e.g., an optical signal sent from an optical fiber, into the single layer grating structure 211. In some embodiments, forming the opening 270 can include photolithography and etch processes.

In some embodiments, to protect the portions of the metal layer for the receiving reflector layer 265 during the etch processes for forming the opening 270, a photoresist layer may be deposited and patterned to provide a masking structure that exposes the portion of the metal layer in which the opening 270 is formed. In some embodiments, the photoresist mask may be used in combination with a hardmask, which can be composed of a dielectric material, such as an oxide and/or nitride.

Following the formation of the etch mask, an etch process may be used to remove the exposed portion of the metal layer to provide the opening 270 through the receiving reflector layer 265. The etch process used at this stage of the process flow may be an anisotropic etch, such as reactive ion etching (RIE). In some embodiments, the etch process that is used to from the opening 270 through the receiving reflector layer 265 may include an etch chemistry that is selective to the second cladding layer 225. Following forming the opening 270, the etch mask may be removed. For example, the etch mask may be removed using a chemical stripping method.

Figure 9:
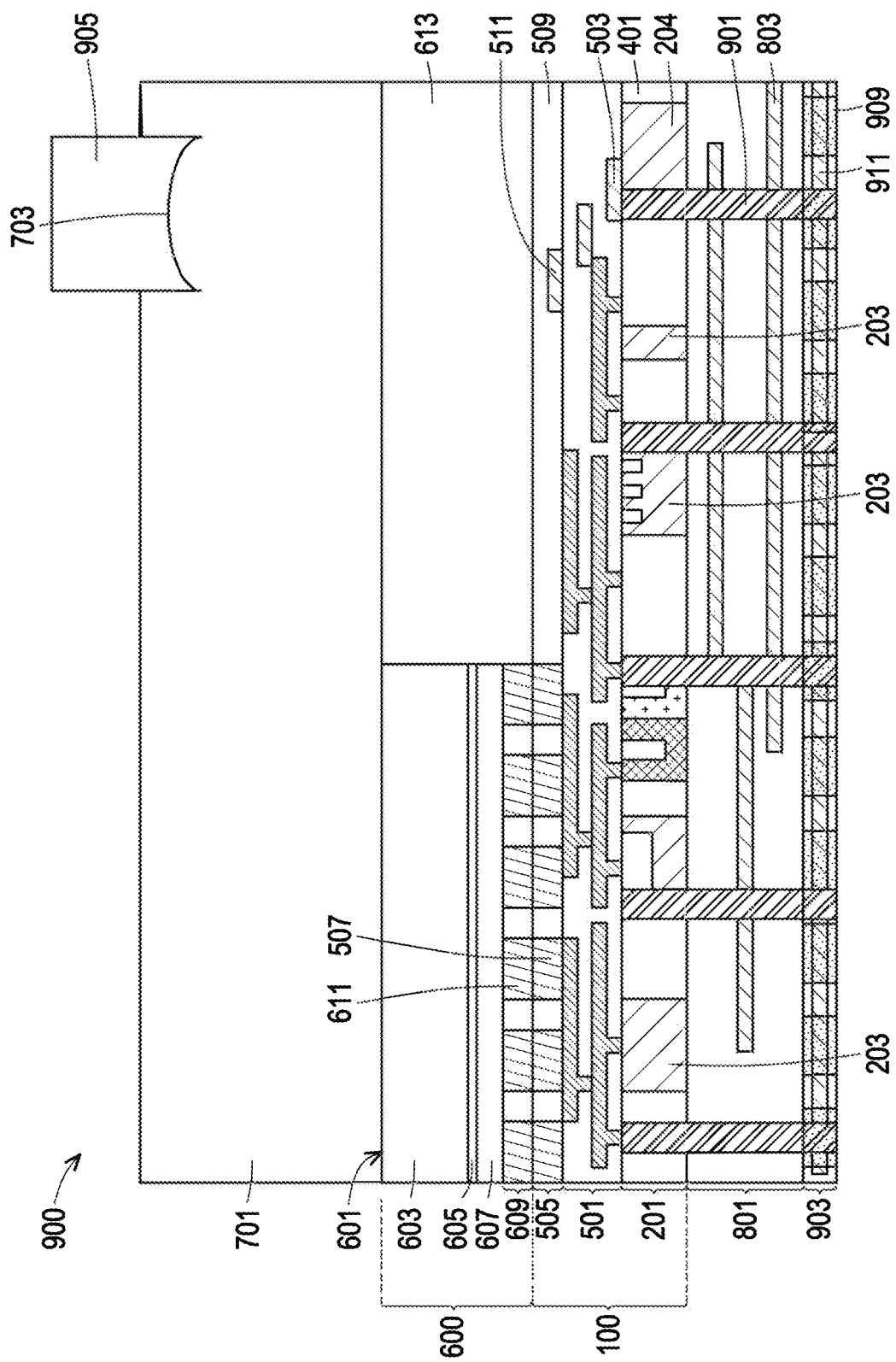

In some embodiments, the opening 270 that is present through the receiving reflector layer 265 is positioned to be present on a first side of the grating coupler 204 for the receiving of optical signals from an optical fiber 905 (seen in FIG. 9). In some embodiments, the first side of the grating structure 204 at which the opening 270 is present is opposite a second side of the grating structure 204 that can include a waveguide interface portion.

Figure 2F:
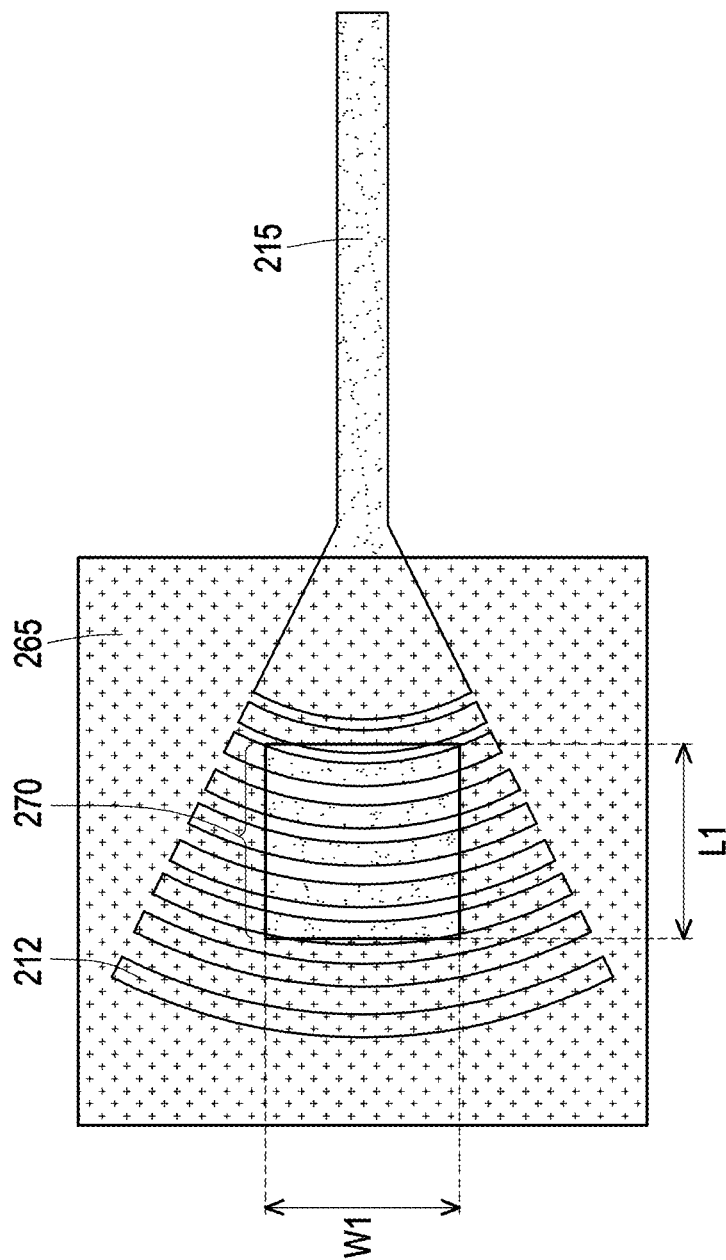
FIG. 2F is a top down view of a grating coupler illustrating an opening through the receiving reflector layer to the single grating layer structure, in accordance with some embodiment.

FIG. 2F is a top down view further illustrating the opening 270 that is present through the receiving reflector layer 265. In one example, the opening 270 may have a width W1 ranging from 1 micron to 50 microns, and the length Li may range from 1 micron to 50 micron. FIG. 2F also illustrates that the single layer grating structure 211 includes gratings having a reducing tapered width towards the waveguide joining portion 215 of the grating coupler 204. FIG. 2F also illustrates that in some embodiments the geometry of the gratings for the set of gratings 212 in the single layer grating structure 211 may include a curvature.

Returning now to FIG. 2E, it is further illustrated that by using the bidirectional reflectors, e.g., the backside reflector layer 260 and the receiving reflector layer 265, the receiving optical signals 271 received from an optical fiber can be effectively coupled into the single layer grating structure 211 of the grating coupler 204 to enhance the coupling and collection efficiency of the optical signals. First, the receiving optical signals 271 transmitted from the optical fiber pass through the opening 270 in the receiving reflector layer 265 into the single layer grating structure 211 of the grating coupler 204. A portion of the optical signal 271 is initially coupled by the single layer grating structure 211. However, a portion of the optical signal 271 is not coupled with the single layer grating structure 211 and passes through the single layer gratings structure 211 towards the backside reflector layer 260. The backside reflector layer 260 can reflect the non-coupled portion of the optical signal for a first time and reflect the non-coupled portion of the optical signal as first reflecting optical signal 272 towards the receiving reflector layer 265. The first reflecting optical signal 272 passes through the single layer grating structure 211, wherein another portion of the optical signal is coupled with the single layer grating structure 211. Another non-coupled portion of the optical signal may pass through the single layer grating structure 211 towards the receiving reflector layer 265. The receiving reflector layer 265 can increase the number of optical signal reflections with the grating coupler 204 by reflecting the optical signal back towards the backside reflector layer 265. For example, non-coupled signal from the first reflecting optical signals 272 can reflect off the lower surface of the receiving reflector layer 265 as second reflecting optical signal 273 having a direction towards the backside reflector layer 260. In some embodiments, the characteristics of the double-layer metal reflection provided by the combination of the receiving reflector layer 265 and the backside reflector layer 260 can effectively confine and concentrate the optical signals as coupled optical signals 274 traveling towards the waveguide interface portion 15 of the grating coupler 204 further enhancing the optical device's coupling and collection efficiency.

Figure 2G:
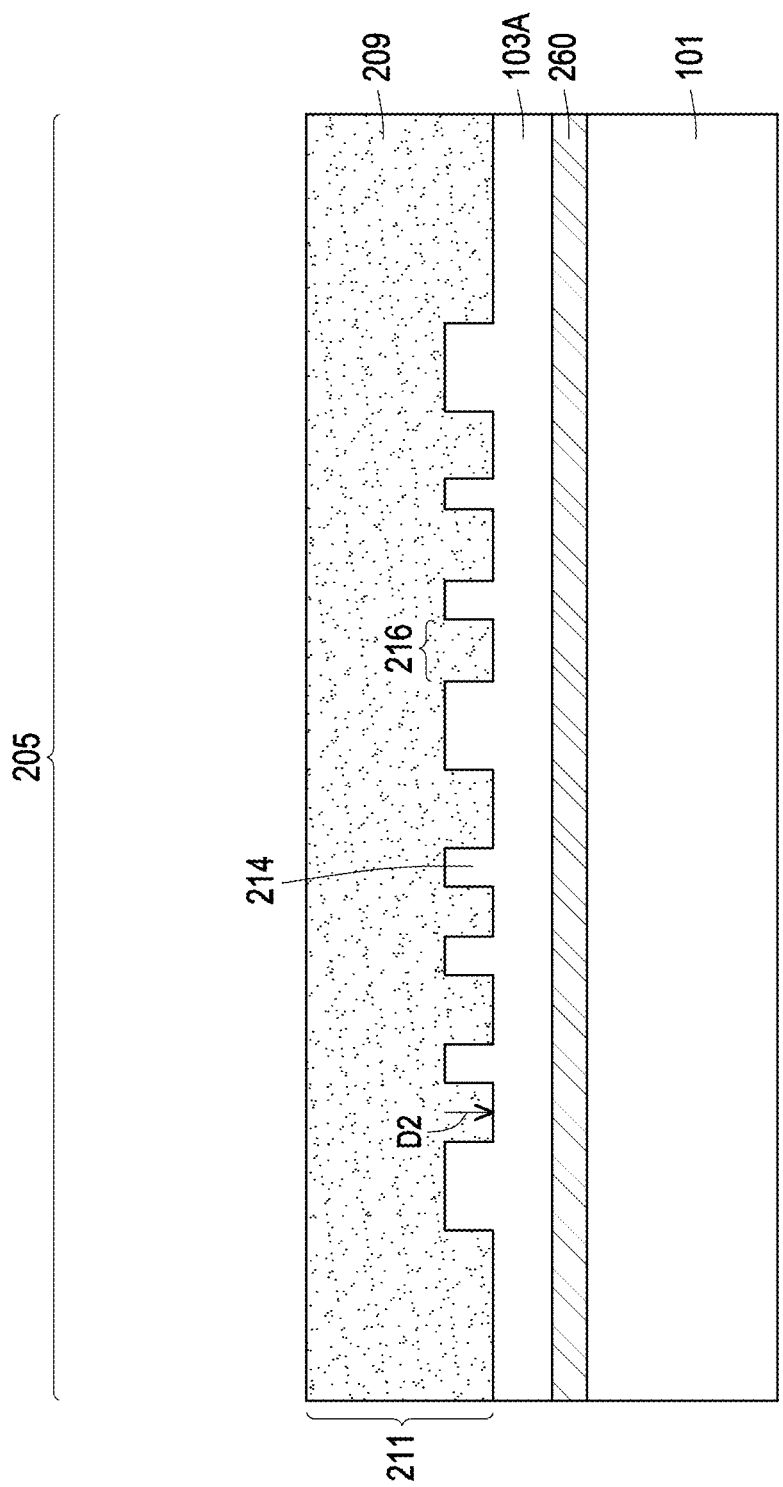
FIG. 2G is a side-cross sectional view illustrating etching trenches in a first cladding layer, and depositing the single material layer for the single layer grating structure, in which the material filling the trenches provides a second set of gratings extending in a second direction, in accordance with some embodiments.
Figure 2H:
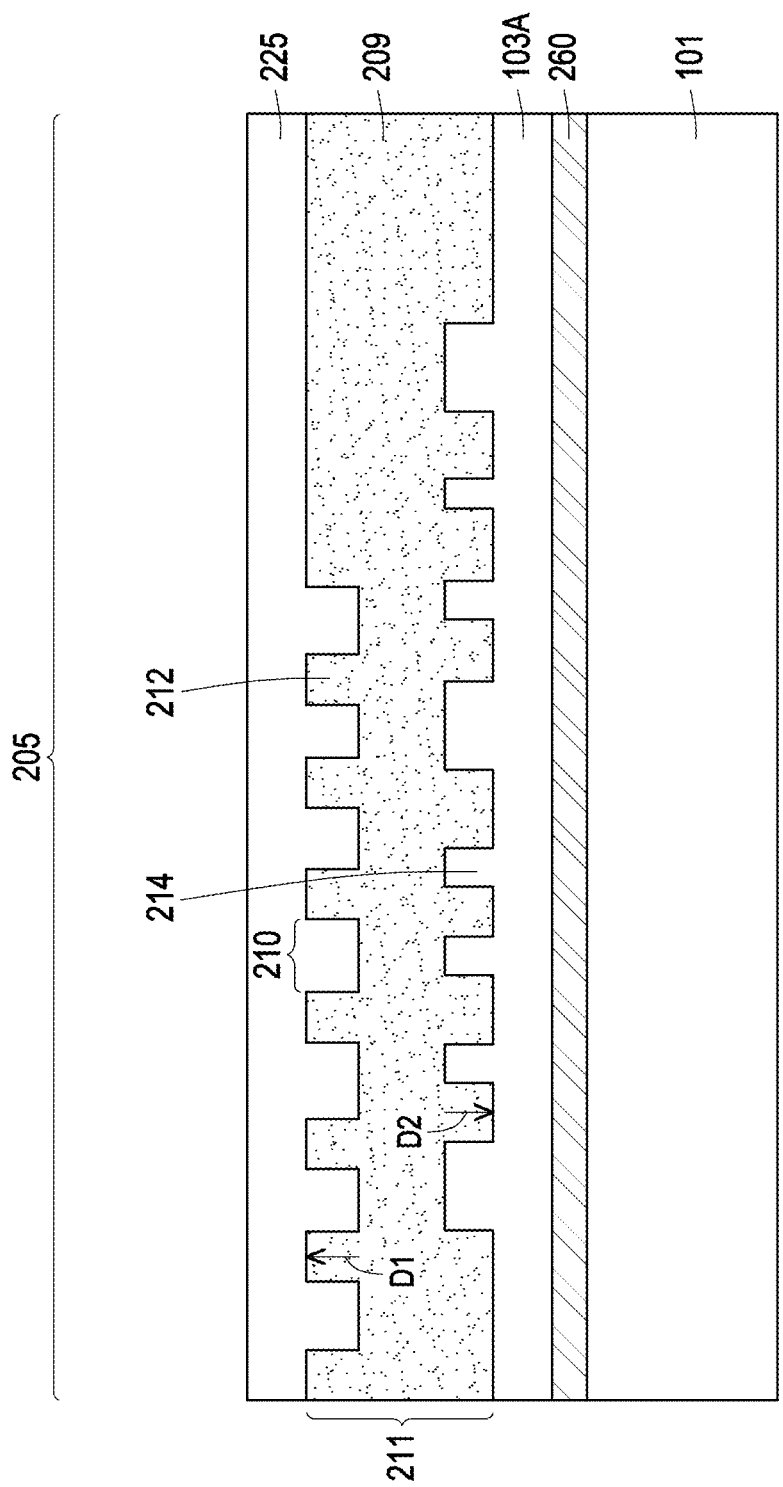
FIG. 2H is a side cross-sectional view illustrating etching trenches in the single material layer for the single layer grating structure to form a first set of trenches extending in a first direction, and forming a second cladding layer on the single layer grating structure, in accordance with some embodiments.
Figure 2I:
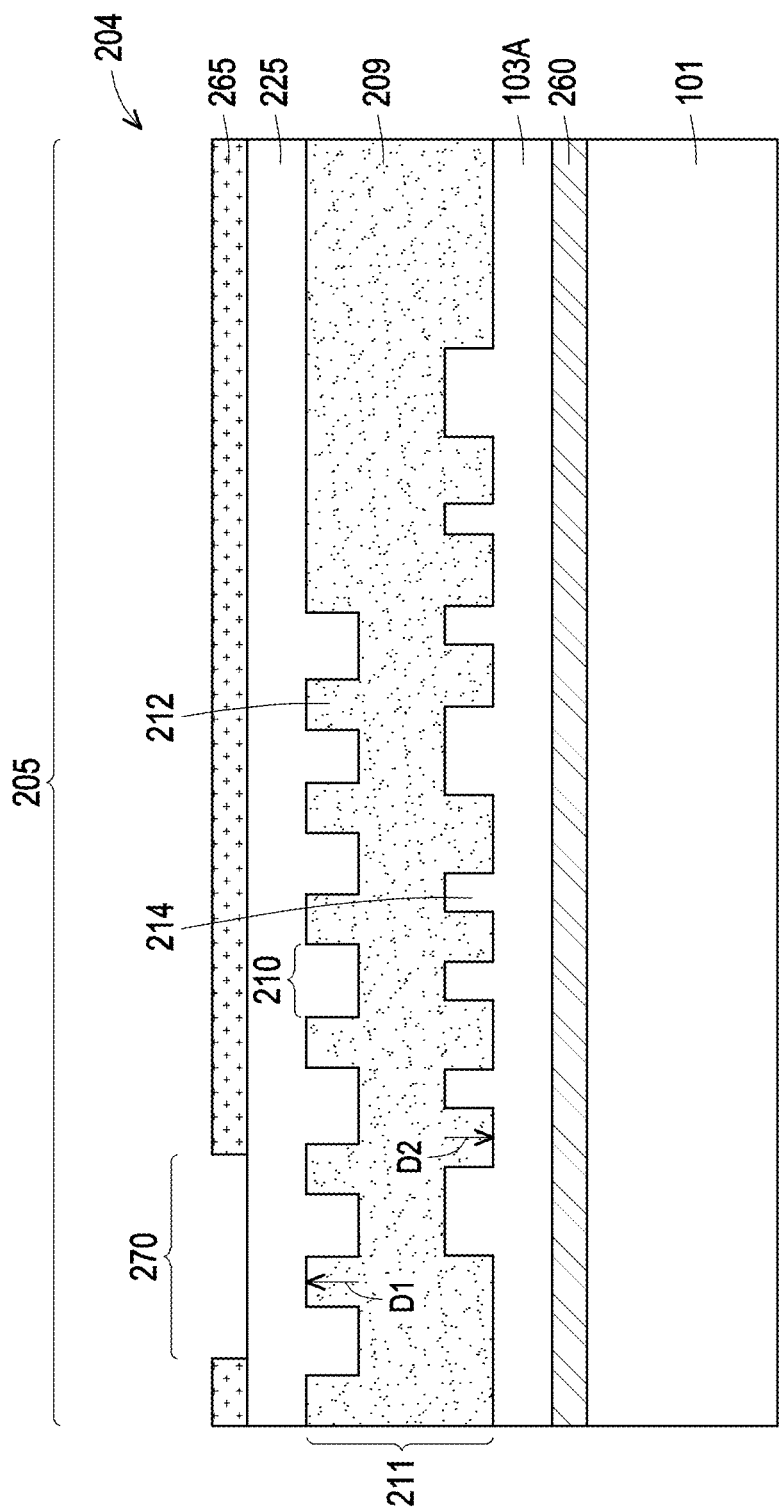
FIG. 2I is a side cross-sectional view illustrating forming a receiving reflector layer on the second cladding layer, wherein the receiving reflector layer includes an opening for receiving optical signal to at least the single layer grating structure, in accordance with some embodiments.

FIGS. 2G-2I illustrate an embodiment of the grating coupler 204 that includes a single layer grating structure 211 having bidirectional gratings, e.g., a first set of gratings 212 having a first direction D1 and a second set of gratings 214 having a second direction D2, in which the first and second directions D1, D2 are opposite one another (seen in FIG. 2I). The first set of gratings 212 is formed on the upper surface of the single material layer 209 of the single layer grating structure 211. In some embodiments, the second set of gratings 214 is present on the opposing lower surface of the single material layer 209 of the single layer grating structure 211. The first set of gratings 212 that is present on the upper surface of the single material layer 209 of the single layer grating structure 211 can be similar to the set of gratings 212 depicted in FIGS. 2C-2E. During the processing of the grate coupler portion 205 that is depicted in FIGS. 2G-2I, the remaining portions of the interposer 100 including the first optical components 203 may be protected by one or more block masks and/or hard masks.

FIG. 2G illustrates an initial structure that can be used for a process flow that provides the bidirectional reflectors, e.g., the receiving reflector layer 265 and the backside reflector layer 260, with a single layer grating structure 211 including bidirectional gratings. The initial structure depicted in FIG. 2G includes a first substrate 101, the backside reflector layer 260 and a first cladding layer 103A. Each of these elements have been described above with reference to FIGS. 2-2F. The above description of these elements is suitable for the elements having the same reference numbers in FIG. 2G.

FIG. 2G also illustrates etching trenches 216 in the first cladding layer 103A, and depositing the single material layer 209 for the single layer grating structure 211. In this embodiment, the material filling the trenches 216 provides the second set of gratings 214 extending in the second direction D2. In some embodiments, forming the trenches 216 in the first cladding layer 103A includes forming an etch mask (not shown). The etch mask protects portions of the first cladding layer 103A to form the trenches 216. In some embodiments, the etch process for forming the trenches 216 may be a directional etch, such as reactive ion etching (RIE). The trenches 216 that are formed in the first cladding layer 103A are subsequently filled with material from the subsequently formed single material layer 209 for the single layer grating structure 211. In some embodiments, filling the trenches 216 with the material of the single material layer 209 provides the second set of gratings 214. In some embodiments, the trenches 216 may be patterned having a geometry with a curvature and a tapering width so that when filled with the material of the single material layer 209 can provide a second set of gratings 214 having the geometry with a curvature and tapering width towards the waveguide joining portion 215, which is similar to the geometry of the gratings 212 that is depicted in FIG. 2F.

FIG. 2G also illustrates one embodiment of forming the single material layer 209 on the first cladding layer 103A after the trenches 216 are formed. In the embodiment that is depicted in FIGS. 2G-2I, the single material layer 209 for the single layer grating structure 211 is provided from a material layer that is deposited using a single deposition step. In some embodiments, the single material layer 209 may be composed of a semiconductor containing material, such as a silicon containing material, e.g., silicon (Si). In some embodiments, the single material layer 209 may be composed of a dielectric material, such as a nitride containing material, e.g., silicon nitride ($Si_3N_4$).

In some embodiments, the single material layer 209 may be deposited using a chemical vapor deposition (CVD) process, in which the deposition parameters are selected to at least fill the trenches 216 with the material of the single material layer 209. In one example, the chemical vapor deposition (CVD) process may be plasma enhanced chemical vapor deposition (PECVD). In other examples, the single material layer 209 may be deposited using high density plasma chemical vapor deposition (HDPCVD), atomic layer deposition (ALD) or physical vapor deposition (PVD).

FIG. 2H illustrates an embodiment of etching trenches 210 in the single material layer 209 for the single layer grating structure 211 to form the first set of gratings 212 extending in a first direction D1. The trenches 210 being formed depicted in FIG. 2H are similar to the trenches 210 that are illustrated being formed in FIG. 2C. Therefore, the above description of forming the trenches 210 provided above with reference to FIG. 2C is suitable for describing forming the trenches 210 in the single material layer 209 that are defining the first set of gratings 212 depicted in FIG. 2H. To summarize, in some embodiments, forming the trenches 210 may include photolithography and etch methods.

In some embodiments, the depth of the trenches 210 may be adjusted to provide for different grating heights within the first set of gratings 212 for coupling with different wavelengths of light. In some examples, the height of the first set of gratings 212 may be varied from by changing the etch depth for the trenches 210. To vary the etch depth of the trenches 210, one or more etch masks and etch processes may be applied in which the etch time is varied to vary the different etch depths. In further embodiments, the etch processes may be accompanied with an ion implantation that can change the etch rate of the material being etched. In other examples, the height of the gratings may be varied by recessing the upper surfaces of the gratings themselves, which can also be achieved using multiple mask and etch steps.

FIG. 2H also illustrates forming a second cladding layer 225 atop the single layer grating structure 211. The second cladding layer 225 may be composed of an oxide containing material composition, such as silicon oxide ($SiO_2$). The second cladding layer 225 may also be composed of silicon nitride, germanium oxide, germanium nitride, and combinations thereof. The second cladding layer 225 may be deposited using a chemical vapor deposition (CVD) process. It is noted that chemical vapor deposition (CVD) is only one example of a deposition process that is suitable for forming the second cladding layer 225. In other examples, the second cladding layer 225 may be formed using a deposition process, such as atomic layer deposition (ALD) or physical vapor deposition (PVD).

FIG. 2I illustrates one embodiment of forming the receiving reflector layer 265 on the second cladding layer 225. In some embodiments, the receiving reflector layer 265 includes an opening 270 for receiving optical signals to at least the single layer grating structure 211 including bidirectional gratings, e.g., a first set of gratings 212 extending in a first direction D1, and a second set of gratings 214 extending in a second direction D2. The receiving reflector layer 265 may also be referred to as a mirror layer, e.g., a receiving mirror layer. The receiving reflector layer 265 may also be referred to as a distributed Bragg reflector.

Figure 2J:
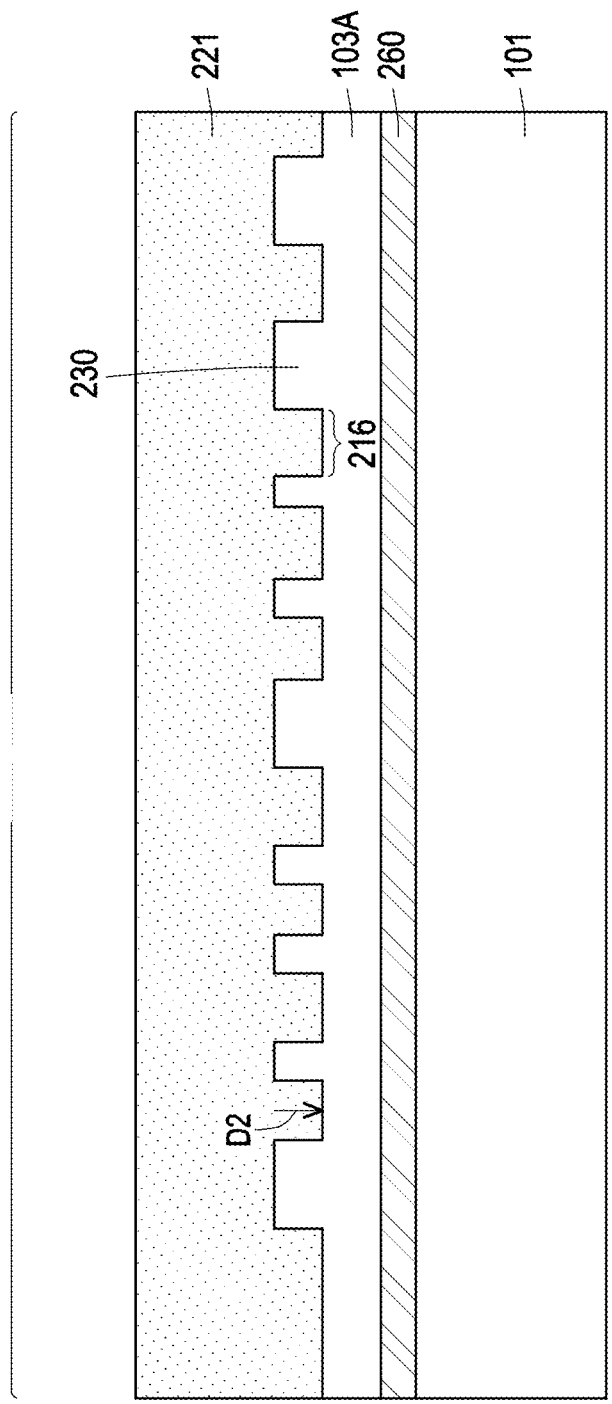
FIG. 2J is a side cross-sectional view illustrating forming trenches in a first cladding layer and forming a first grating layer for a multilayered grating structure on the first cladding layer, wherein the material from the first grating layer filling the trenches in the first cladding layer provides a third multilayer set of gratings, in accordance with some embodiments.
Figure 2K:
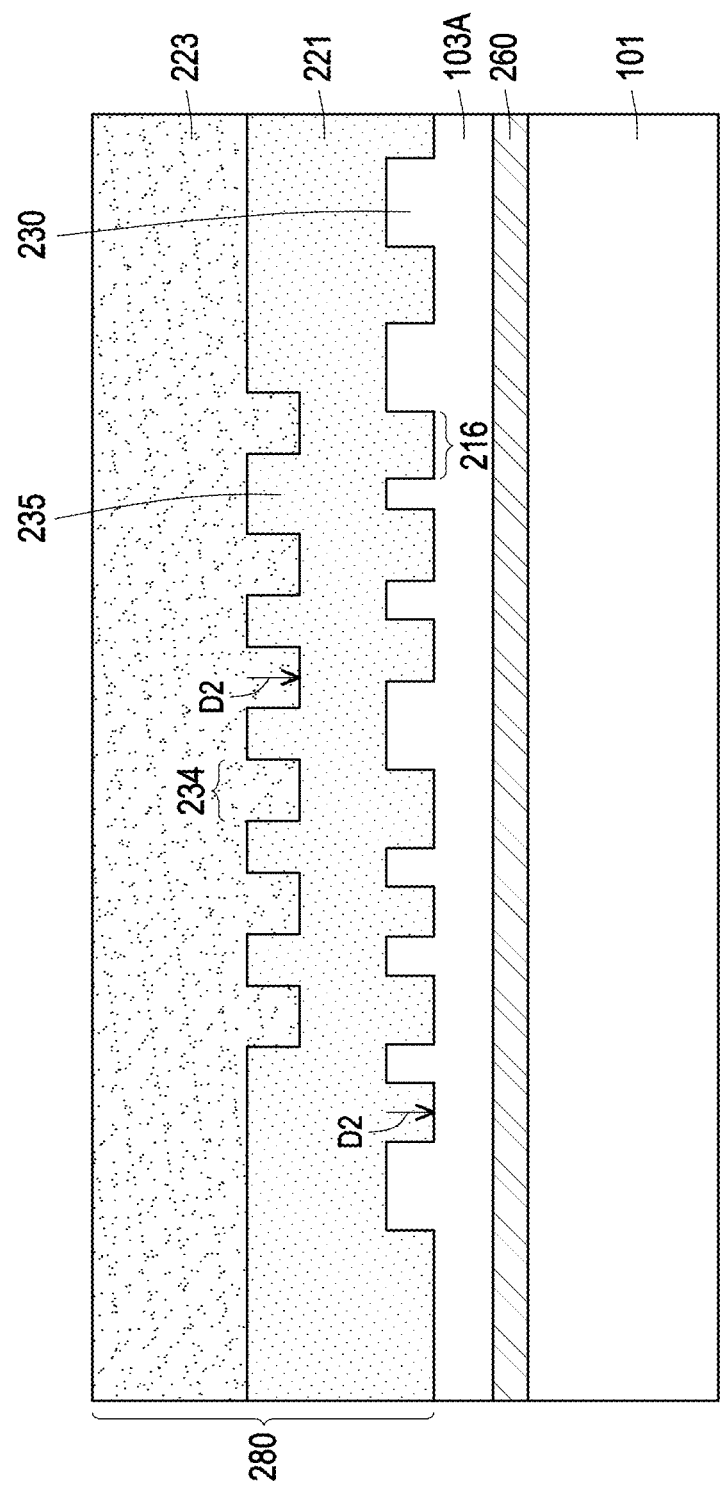
FIG. 2K is a side cross-sectional view illustrating forming trenches in the first material layer for the multilayered grating structure and forming a second material layer for the multilayered grating structure on the first material layer, wherein the material from the second material layer fills the trenches in the first grating layer to provide a second multilayer set of gratings, in accordance with some embodiments.
Figure 2L:
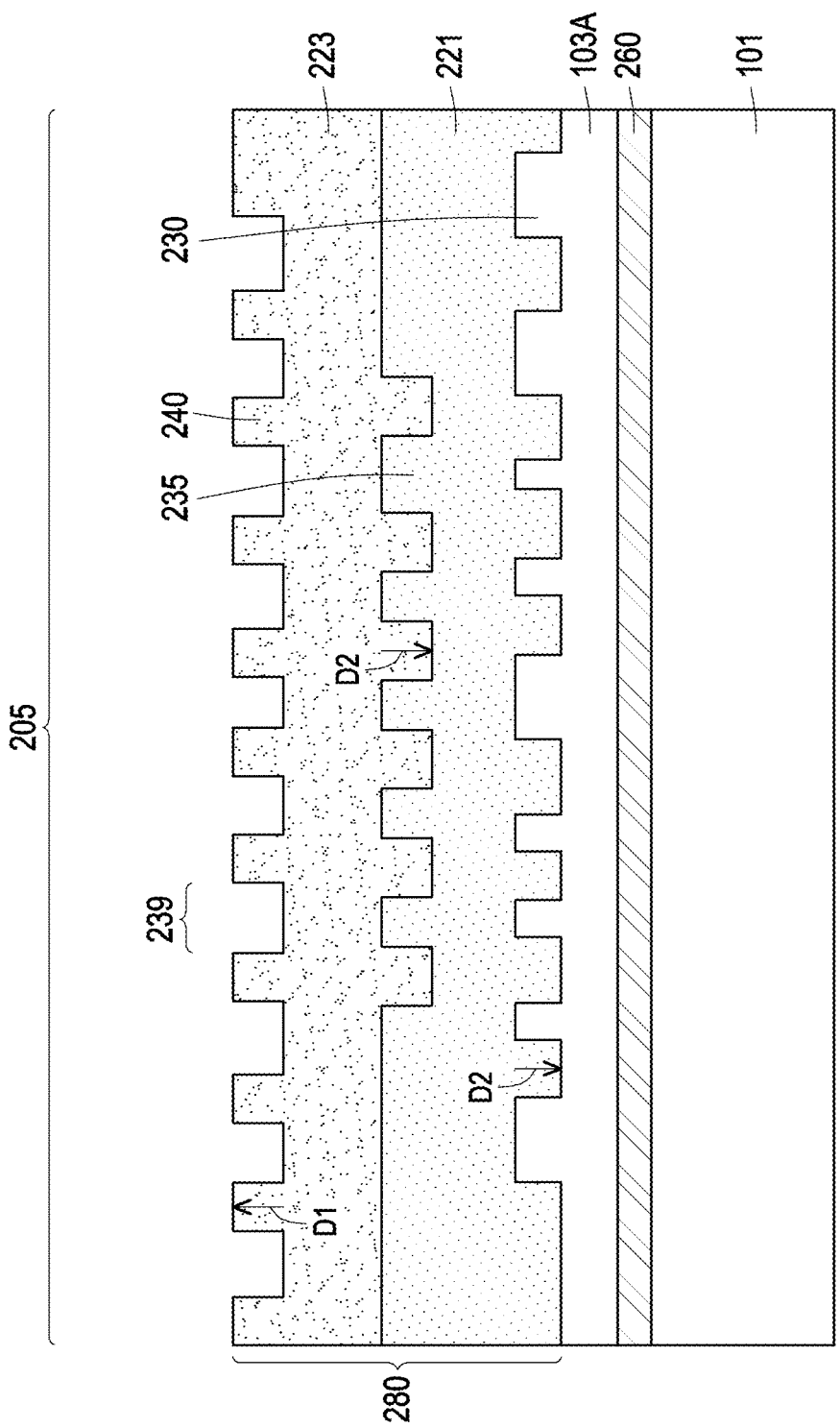
FIG. 2L is a side cross-sectional view illustrating forming trenches in the second grating layer for the multilayered grating structure to form a first multilayered set of gratings, in accordance with some embodiments.
Figure 2M:
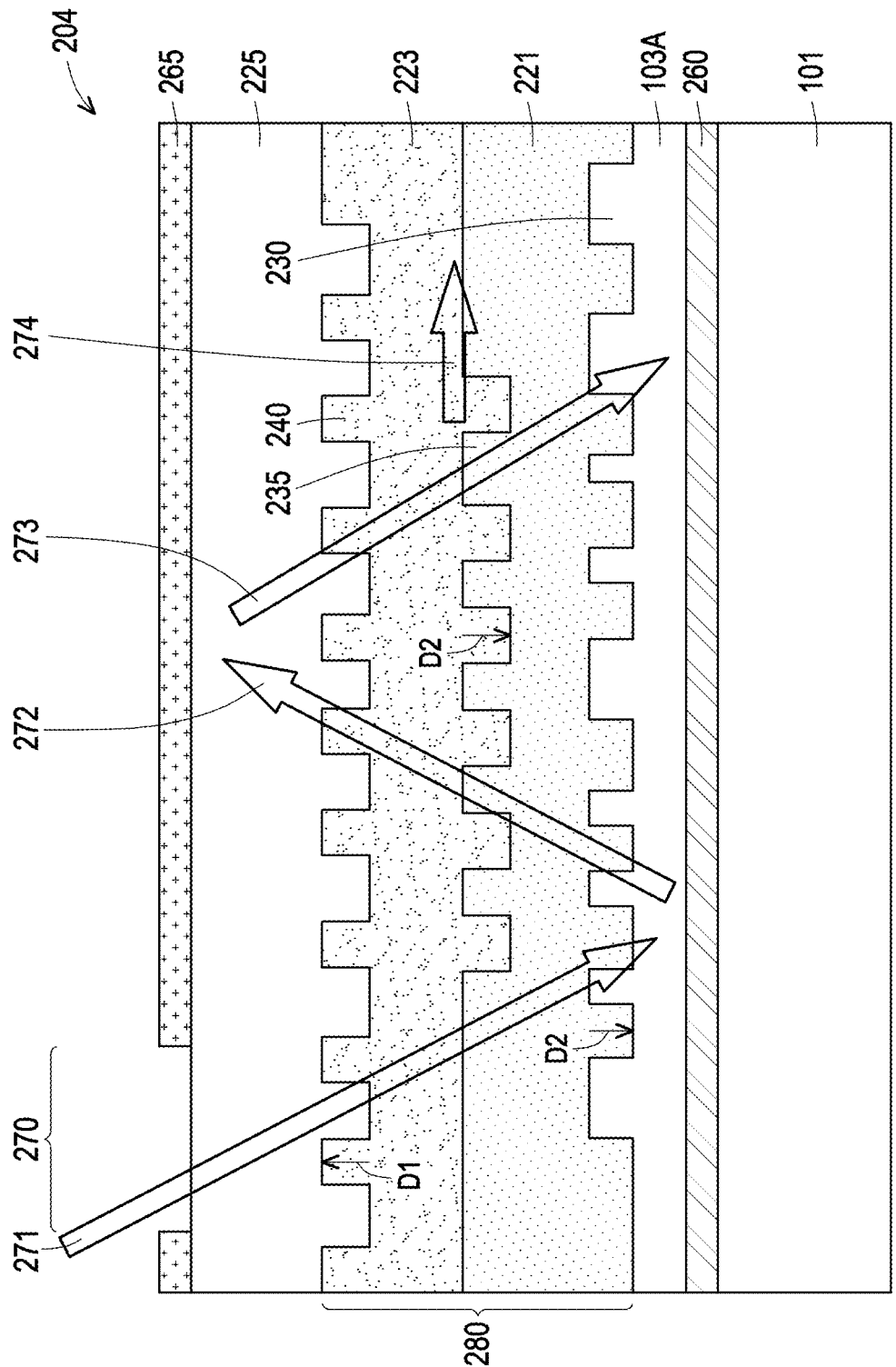
FIG. 2M is a side cross-sectional view of illustrating forming a receiving reflector layer on the second cladding layer, wherein the receiving reflector layer includes an opening for receiving optical signal to at least the multilayered grating structure, in accordance with some embodiments.

The receiving reflector layer 265 depicted in FIG. 2M is similar to the receiving reflector layer 265 that is depicted in FIGS. 2E and 2I. Therefore, the above description of the receiving reflector layer 265 depicted in FIGS. 2E and 2I is suitable for describing at least one embodiment of the receiving reflector layer 265 that is depicted in FIG. 2M.

In some embodiments, the receiving reflector layer 265 may be composed of a metal containing composition material. For example, the receiving reflector layer 265 may be composed of a metal, such as gold (Au), silver (Ag), copper (Cu), tin (Sn), aluminum (Al), tungsten (W), tantalum (Ta), platinum (Pt) and alloys thereof.

In some embodiments, the opening 270 through the receiving reflector layer 265 may be formed for receiving optical signal, e.g., an optical signal sent from an optical fiber, into the single layer grating structure 211. In some embodiments, forming the opening 270 can include photolithography and etch processes.

In some embodiments, the opening 270 that is present through the receiving reflector layer 265 is positioned to be present on a first side of the grating coupler 204 for the receiving of optical signals from an optical fiber 905 (seen in FIG. 9). In some embodiment, the first side of the grating structure 204 at which the opening 270 is present is opposite a second side of the grating structure 204, in which the second side of the grating coupler 204 can include a waveguide interface portion 15 of the grating coupler.

Referring to FIG. 2I, in addition to the advantages provided by the bidirectional reflectors, e.g., the backside reflector layer 260 and the receiving reflector layer 265, providing for multiple reflections of optical signals as the optical signals traverse through the grating coupler 204 towards the waveguide joining portion 215, the bidirectional gratings can allow for coupling of different wavelengths of light. For example, the height of the grating in the first set of gratings 212 and the second set of gratings 214 may be adjusted for coupling with different wavelengths to provide a low loss design. In one example, each of the first and second sets of gratings 212 may have differently dimensioned gratings to provide that the first and second set of gratings 212, 214 are optimized to couple with different wavelengths of light in a low loss design.

In yet other examples, the distance separating adjacently positioned gratings may also be increased and decreased for coupling with different wavelengths of light. For example, the distance separating adjacently positioned gratings in the second set of gratings 214 may be greater than the distance separating adjacently positioned gratings in the first set of gratings 212. In some examples, this may provide that the second set of gratings 214 is suitable for coupling with light having a broader bandwidth than the wavelengths of light that the first set of gratings 212 is configured for coupling with.

FIGS. 2J-2M illustrate an embodiment of a grating coupler 204 that includes bidirectional reflectors, e.g., the receiving reflector layer 265 and the backside reflector layer 260, with a grating layer that may be a multilayered structure. In some embodiments, the multilayered structure that provides bidirectional gratings, e.g., a first multilayer set of gratings 212 having a first direction D1 and a second multilayer set of gratings 214 having a second direction D2, in which the first and second directions D1, D2 are opposite one another. In yet further embodiments, the multilayered structure for the grating layer can provide at least three separate sets of gratings, e.g., the first multilayer set of gratings 240, the second multilayer set of gratings 235, and a third multilayer set of gratings 230. During the processing of the grating coupler portion 205 that is depicted in FIGS. 2J-2M, the remaining portions of the interposer 100 including the first optical components 203 may be protected by one or more block masks and/or hard masks.

FIG. 2J illustrates an initial structure that can be used for a process flow that provides bidirectional reflectors, e.g., the receiving reflector layer 265 and the backside reflector layer 260, with a multilayered grating structure 280 (as illustrated in FIG. 2K) including bidirectional gratings. The initial structure depicted in FIG. 2J includes the first substrate 101, the backside reflector layer 260 and the first cladding layer 103A. Each of these elements have been described above with reference to FIGS. 2-2F. The above description of these elements is suitable for the elements having the same reference numbers in FIG. 2J.

FIG. 2J also illustrates that an upper surface of the first cladding layer 103A has been etched to provide a plurality of trenches 216. The trenches 216 depicted in FIG. 2J are similar to the trenches 216 present in the upper surface of the first cladding layer 103A that is depicted in FIG. 2G. Therefore, the above description of the trenches 216 that are depicted in FIG. 2G is suitable for describing at least one embodiment of forming the trenches 216 of the upper surface of the first cladding layer 103A that is depicted in FIG. 2J.

FIG. 2J also depicts forming a first grating layer 221 for the multilayered grating structure 280 on the first cladding layer 103A. In some embodiments, the first grating layer 221 may be composed of a semiconductor containing material, such as silicon (Si). In some embodiments, the first grating layer 221 may be composed of a nitride containing material, such as silicon nitride ($Si_3N_4$). It is noted that the material of the first grating layer 221 fills the trenches 216 in the upper surface of the first cladding layer 103A. The material of the first grating layer 221 may be deposited using a chemical vapor deposition (CVD) process, in which the deposition parameters are selected to at least fill the trenches 216. In one example, the chemical vapor deposition (CVD) process may be plasma enhanced chemical vapor deposition (PECVD). The material of the first grating layer 221 that fills the trenches 216 provides the third multilayer structure set of gratings 230.

FIG. 2K illustrates forming trenches 234 in the first grating layer 221 for the multilayered grating structure 280 and forming a second grating layer 223 for the multilayered grating structure 280 on the first grating layer 231. In some embodiments, the material from the second grating layer 223 fills the trenches 234 in the first grating layer 221 to provide a second multilayer set of gratings 235. Therefore, in some embodiments, because the geometry of the trenches 234 is dictating the geometry of the gratings, the trenches 234 may be etched having a curvature and tapering width having a greatest width at an optical signal entry point for the plurality of gratings to a narrowest width at a waveguide interfacing portion of the plurality of gratings. The trenches 234 may be formed using photolithography, e.g., photoresist etch mask formation, and etch processes, e.g., reactive ion etching (RIE).

FIG. 2K also illustrates an embodiment of depositing a second grating layer 223 on the first grating layer 221 to form a second multilayer set of gratings 235. In some embodiments, the second grating layer 223 may be composed of a semiconductor containing material, such as a silicon containing material, e.g., silicon. In some embodiments, the second grating layer 223 may be composed of a dielectric material, such as a nitride containing material, e.g., silicon nitride. The second grating layer 223 may be deposited using a chemical vapor deposition (CVD) process, in which the deposition parameters are selected to at least fill the trenches 234. In one example, the chemical vapor deposition (CVD) process may be plasma enhanced chemical vapor deposition (PECVD).

The material of the second grating layer 223 fills the trenches 234 that provides the second multilayer set of gratings 235. The second multilayered set of gratings 235 are present at the interface of the first grating layer 221 and the second grating layer 223. The second multilayered set of gratings 235 have a height that extends in a second direction D2 into the trenches 234 formed in the first grating layer 221.

FIG. 2L illustrates forming trenches 239 in the second grating layer 223 of the multilayered grating structure 280 to form a first multilayer set of gratings 240. In some embodiments, forming the first multilayered set of gratings 240 in the upper surface of the second grating layer 223 may include forming an etch mask (not shown) that is patterned to expose portions of the second grating layer 233 to be etched to form the trenches 239. The etch mask may be a photoresist mask that is formed using photolithography. The trenches 239 may be formed using an anisotropic etch process, such as reactive ion etching (RIE). The portions of the second grating layer 223 present between each set of trenches 239 provides the gratings for the first multilayer set of gratings 240. Following the etch process, the etch mask may be removed using a chemical stripping process.

The first multilayered set of gratings 240 may have a geometry with a curvature and a tapering width similar to the grating geometry that is depicted in the top-down view illustrated in FIG. 2F. The first multilayered set of gratings 240 are present in an upper surface of the second grating layer 223 and have a height that extends in a first direction D1.

The first direction D1 for the first multilayered set of gratings 240 is opposite the second direction D2 for the second multilayered set of gratings 235 and the third multilayered set of gratings 230. In some embodiments, the opposing first and second directions D1, D2 for first multilayered set of gratings 240 and the second and third multilayered sets of gratings 235, 230 provide a bidirectional multilayered grating coupler structure 280. The first multilayered set of gratings 240 that are present in the upper surface of the second grating layer 223 are vertically offset from the second multilayered set of gratings 235 that are present at the interface of the first grating layer 221 and the second grating layer 223. The first and second multilayered sets of gratings 240, 235 are also vertically offset from the first multilayered set of gratings 230 that are present at the lower surface of the first grating layer 221. In some embodiments, the vertical offset of the first multilayered set of gratings 240 from the second multilayered set of gratings 235 and the third multilayered set of gratings 230 can improve the coupling efficiency of the grating coupler 204. For example, by offsetting the direction and center position of the gratins, the coupling efficiency may be increased, while reducing insertion loss and reflection loss.

In yet some other embodiments, the distance separating adjacently positioned gratings for the first multilayered set of gratings 240, the second multilayered set of gratings 235 and the third multilayered set of gratings 230 may be chosen (e.g., increased and/or decreased) for coupling with different wavelengths of light. For example, the distance separating adjacently positioned gratings in the third multilayer set of gratings 230 may be greater than the distance separating adjacently positioned gratings in the first and second multilayered sets of gratings 240, 235 to provide that the third multilayered set of gratings 230 is configured for coupling with broad bands of light. For example, the broadband design of the third multilayered set of gratings 230 may couple with broader band waves of light than the light that is coupled with the first and second multilayered sets of gratings 240, 235.

FIG. 2M illustrates forming a second cladding layer 225 atop the multilayer grating structure 280. The second cladding layer 225 may be composed of an oxide containing material composition, such as silicon oxide ($SiO_2$). The second cladding layer 225 may also be composed of silicon nitride, germanium oxide, germanium nitride, and combinations thereof. The second cladding layer 225 may be deposited using a chemical vapor deposition (CVD) process. It is noted that chemical vapor deposition (CVD) is only one example of a deposition process that is suitable for forming the second cladding layer 225. In other examples, the second cladding layer 225 may be formed using a deposition process, such as atomic layer deposition (ALD) or physical vapor deposition (PVD).

FIG. 2M also illustrates forming the receiving reflector layer 265 on the second cladding layer 225, wherein the receiving reflector layer 265 includes an opening 270 for receiving optical signal to at least the multilayered grating structure 280. The receiving reflector layer 265 depicted in FIG. 2M is similar to the receiving reflector layer 265 that is depicted in FIGS. 2E and 2I. Therefore, the above description of the receiving reflector layer 265 depicted in FIGS. 2E and 2I is suitable for describing at least one embodiment of the receiving reflector layer 265 that is depicted in FIG. 2M. In some embodiments, the receiving reflector layer 265 includes an opening 270 for receiving optical signal to at least the multilayered grating structure 280. Further, in some embodiments, the receiving reflector layer 265 may be a distributed Bragg reflector.

In some embodiments, the receiving reflector layer 265 may be composed of a metal containing composition material. For example, the receiving reflector layer 265 may be composed of a metal, such as gold (Au), silver (Ag), copper (Cu), tin (Sn), aluminum (Al), tungsten (W), tantalum (Ta), platinum (Pt) and alloys thereof.

In some embodiments, the opening 270 through the receiving reflector layer 265 may be formed for receiving the optical signal, e.g., the optical signal sent from the optical fiber, into the multilayer grating structure 280. In some embodiments, forming the opening 270 can include photolithography and etch processes.

In some embodiments, the opening 270 that is present through the receiving reflector layer 265 is positioned to be present on a first side of the grating coupler 204 for the receiving of optical signal from an optical fiber 905 (seen in FIG. 9). In some embodiment, the first side of the grating structure 204 at which the opening 270 is present is opposite a second side of the grating structure 204, in which the second side of the grating coupler 204 can include a waveguide interface portion of the grating coupler 204.

FIG. 2M illustrates one embodiment of a bi-directional reflective mirror, e.g., the backside reflector layer 260 and the receiving reflector layer 265, coupled with a bi-directional and multilayered grating structure 280 can effectively enhance the coupling efficiency for a grating coupler 204. In some embodiments, the receiving optical signal 271 received from an optical fiber can be effectively coupled into the multilayered grating structure 280 of the grating coupler 204 to enhance the coupling and collection efficiency of optical signals. First, the receiving optical signal beams 271 transmitted from the optical fiber pass through the opening 270 in the receiving reflector layer 265 into the multilayered grating structure 280 of the grating coupler 204. A portion of the optical signal beams 271 are coupled with the multilayered grating structure 280, and a portion of the optical signal beams 271 pass through the multilayered grating structure 280. The backside reflector layer 260 can reflect the optical signal for a first time and reflect the optical signal as first reflecting optical signal 272 towards the receiving reflector layer 265. The first reflecting optical signal 272 passes through the multilayered grating structure 280, in which a portion of the first reflecting optical signal 272 is coupled with the multilayered grating structure 280. A portion of the first reflecting optical signal 272 is not coupled with the multilayered grating structure 280 and extends toward the receiving reflector layer 265. The receiving reflector layer 265 can increase the number of optical signal reflections with the grating coupler 204 by reflecting the optical signal back towards the backside reflector layer 265. For example, optical signal from the first reflecting optical signal 272 not coupled with the multilayered grating structure 280 can reflect off the lower surface of the receiving reflector layer 265 as second reflecting optical signal 273 having a direction towards the backside reflector layer 260. In some embodiments, the characteristics of the double-layer metal reflection provided by the combination of the receiving reflector layer 265 and the backside reflector layer 260 can effectively confine and concentrate the optical signal as coupled optical signals 274 traveling towards the waveguide interface portion of the grating coupler 204 further enhancing the optical device's coupling and collection efficiency. The layers of the grating, e.g., first multilayered set of gratings 240, second multilayered set of gratings 235 and the first multilayered set of gratings 230, can also efficiently couple the reflected optical signal from multiple reflections into the waveguide, significantly increasing the coupling efficiency. Furthermore, designing a broadband grating and high coupling efficiency grating, and combining them with the mirror can increase the bandwidth and coupling efficiency. A double design can greatly increase the broadband and high coupling efficiency effect.

FIGS. 3-9 illustrate formation of an optical package integrating the grating coupler 204 as described above with reference to FIGS. 2A-2M. Each of the embodiments depicted in FIGS. 2A-2M may be integrated into the optical package described with reference to FIGS. 3-9. For simplicity, the different embodiments for the grating couplers depicted in FIGS. 2A-2M may collectively be depicted by the structure having reference number 204 in FIGS. 3-9. In some embodiments, prior to processing to integrate the grating coupler 204 into an optical package, any masking structures, e.g., hard masks and/or photoresist masks, used to isolate the grating coupler portion 205 of the interposer 100 during forming the grating coupler 204 may be removed.

FIG. 3 illustrates that, for those components that utilize further manufacturing processes, such as Mach-Zehnder silicon-photonic switches that utilize resistive heating elements, additional processing may be performed either before or after the patterning of the material for the first active layer 201 for forming the first optical components and/or either before or after forming the grating coupler 204. For example, implantation processes, additional deposition and patterning processes for different materials (e.g., resistive heating elements, III-V materials for converters), combinations of all of these processes, or the like, can be utilized to help further the manufacturing of the various desired first optical components 203. In a particular embodiment, and as specifically illustrated in FIG. 3, in some embodiments an epitaxial deposition of a semiconductor material 301 such as germanium (used, e.g., for electricity/optics signal modulation and transversion) may be performed on a patterned portion of the material 105 of the first active layer 201. In such an embodiment the semiconductor material 301 may be epitaxially grown in order to help manufacture, e.g., a photodiode for an optical-to-electrical converter. All such manufacturing processes and all suitable first optical components 203 may be manufactured, and all such combinations are fully intended to be included within the scope of the embodiments.

FIG. 4 illustrates that, once the grating coupler 204 and the first optical components 203 have been formed, a second insulator layer 401 may be deposited to cover the grating coupler 204 and the first optical components 203. The second insulator layer 401 may provide additional cladding material. In an embodiment the second insulator layer 401 may be a dielectric layer that separates the individual components of the first active layer 201 from each other and from the overlying structures and can additionally serve as another portion of cladding material that surrounds the first optical components 203 and the grating coupler 204. In an embodiment the second insulator layer 401 may be silicon oxide, silicon nitride, germanium oxide, germanium nitride, combinations of these, or the like, formed using a deposition method such as chemical vapor deposition, atomic layer deposition, physical vapor deposition, combinations of these, or the like. Once the material of the second insulator layer 401 has been deposited, the material may be planarized using, e.g., a chemical mechanical polishing process in order to either planarize a top surface of the second insulator layer 401 (in embodiments in which the second insulator layer 401 is intended to fully cover the first optical components 203 and the grating coupler 204) or else planarize the second insulator layer 401 with top surfaces of the first optical components 203 and the grating coupler 204. However, any suitable material and method of manufacture may be used.

Figure 5:
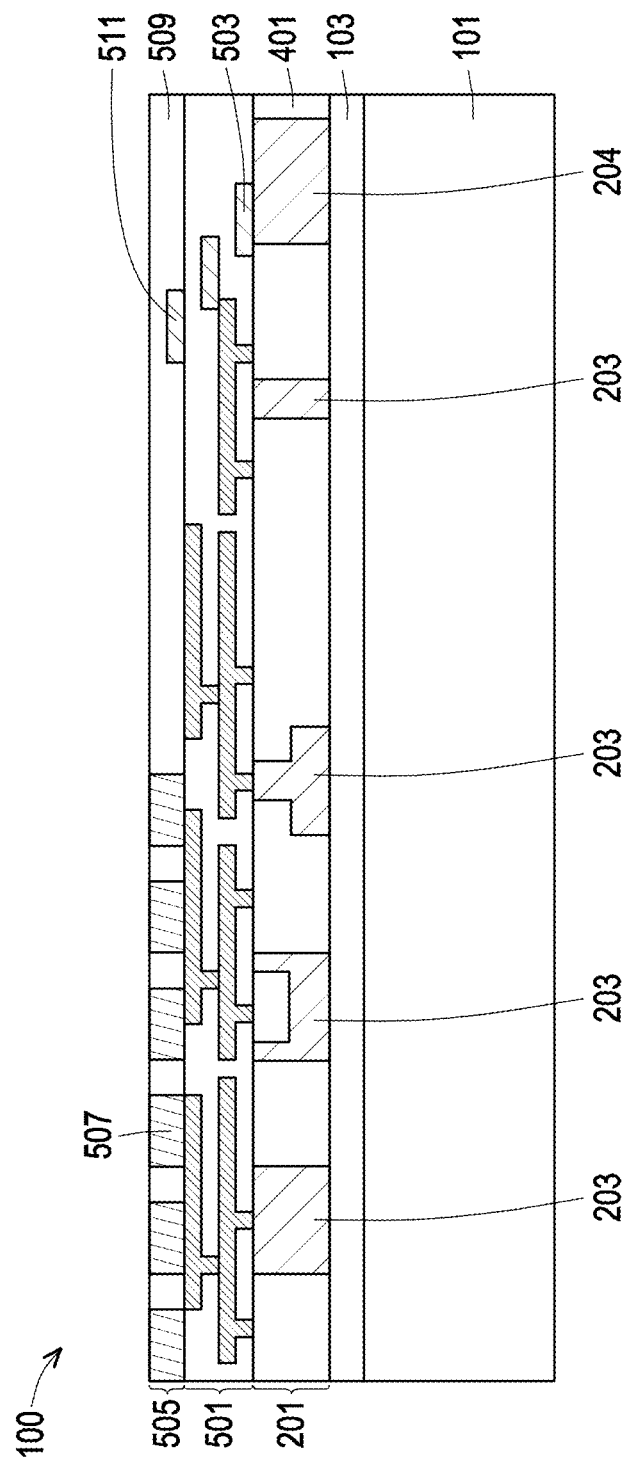

FIG. 5 illustrates that, once the first optical components 203 and the grating coupler 204 have been manufactured and the second insulator layer 401 has been formed, first metallization layers 501 are formed in order to electrically connect the first active layer 201 of first optical components 203 and the grating coupler 204 to control circuitry, to each other, and to subsequently attached devices (not illustrated in FIG. 5 but illustrated and described further below with respect to FIG. 6). In an embodiment the first metallization layers 501 are formed of alternating layers of dielectric and conductive material and may be formed through any suitable processes (such as deposition, damascene, dual damascene, etc.). In particular embodiments there may be multiple layers of metallization used to interconnect the various first optical components 203, as well as the grating coupler 204, but the precise number of first metallization layers 501 is dependent upon the design of the optical interposer 100.

Additionally, during the manufacture of the first metallization layers 501, one or more second optical components 503 may be formed as part of the first metallization layers 501. In some embodiments the second optical components 503 of the first metallization layers 501 may include such components as couplers (e.g., edge couplers, grating couplers, etc.) for connection to outside signals, optical waveguides (e.g., ridge waveguides, rib waveguides, buried channel waveguides, diffused waveguides, etc.), optical modulators (e.g., Mach-Zehnder silicon-photonic switches, microelectromechanical switches, micro-ring resonators, etc.), amplifiers, multiplexors, demultiplexors, optical-to-electrical converters (e.g., P-N junctions), electrical-to-optical converters, lasers, combinations of these, or the like. However, any suitable optical components may be used for the one or more second optical components 503. In an embodiment the one or more second optical components 503 may be formed by initially depositing a material for the one or more second optical components 503. In an embodiment the material for the one or more second optical components 503 may be a dielectric material such as silicon nitride, silicon oxide, combinations of these, or the like, or a semiconductor material such as silicon, deposited using a deposition method such as chemical vapor deposition, atomic layer deposition, physical vapor deposition, combinations of these, or the like. However, any suitable material and any suitable method of deposition may be utilized.

Once the material for the one or more second optical components 503 has been deposited or otherwise formed, the material may be patterned into the desired shapes for the one or more second optical components 503. In an embodiment the material of the one or more second optical components 503 may be patterned using, e.g., one or more photolithographic masking and etching processes. However, any suitable method of patterning the material for the one or more second optical components 503 may be utilized.

For some of the one or more second optical components 503, such as waveguides or edge couplers, the patterning process may be all or at least most manufacturing that is used to form these components. Additionally, for those components that utilize further manufacturing processes, such as Mach-Zehnder silicon-photonic switches that utilize resistive heating elements, additional processing may be performed either before or after the patterning of the material for the one or more second optical components 503. For example, implantation processes, additional deposition and patterning processes for different materials, combinations of all of these processes, or the like, and can be utilized to help further the manufacturing of the various desired one or more second optical components 503. All such manufacturing processes and all suitable one or more second optical components 503 may be manufactured, and all such combinations are fully intended to be included within the scope of the embodiments.

Once the one or more second optical components 503 of the first metallization layers 501 have been manufactured, a first bonding layer 505 is formed over the first metallization layers 501. In an embodiment, the first bonding layer 505 may be used for a dielectric-to-dielectric and metal-to-metal bond. In accordance with some embodiments, the first bonding layer 505 is formed of a first dielectric material 509 such as silicon oxide, silicon nitride, or the like. The first dielectric material 509 may be deposited using any suitable method, such as CVD, high-density plasma chemical vapor deposition (HDPCVD), PVD, atomic layer deposition (ALD), or the like. However, any suitable materials and deposition processes may be utilized.

Once the first dielectric material 509 has been formed, first openings in the first dielectric material 509 are formed to expose conductive portions of the underlying layers in preparation to form first bond pads 507 within the first bonding layer 505. Once the first openings have been formed within the first dielectric material 509, the first openings may be filled with a seed layer and a plate metal to form the first bond pads 507 within the first dielectric material 509. The seed layer may be blanket deposited over top surfaces of the first dielectric material 509 and the exposed conductive portions of the underlying layers and sidewalls of the openings and the second openings. The seed layer may comprise a copper layer. The seed layer may be deposited using processes such as sputtering, evaporation, or plasma-enhanced chemical vapor deposition (PECVD), or the like, depending upon the desired materials. The plate metal may be deposited over the seed layer through a plating process such as electrical or electro-less plating. The plate metal may comprise copper, a copper alloy, or the like. The plate metal may be a fill material. A barrier layer (not separately illustrated) may be blanket deposited over top surfaces of the first dielectric material 509 and sidewalls of the openings and the second openings before the seed layer. The barrier layer may comprise titanium, titanium nitride, tantalum, tantalum nitride, or the like.

Following the filling of the first openings, a planarization process, such as a CMP, is performed to remove excess portions of the seed layer and the plate metal, forming the first bond pads 507 within the first bonding layer 505. In some embodiments a bond pad via (not separately illustrated) may also be utilized to connect the first bond pads 507 with underlying conductive portions and, through the underlying conductive portions, connect the first bond pads 507 with the first metallization layers 501.

Additionally, the first bonding layer 505 may also include one or more third optical components 511 incorporated within the first bonding layer 505. In such an embodiment, prior to the deposition of the first dielectric material 509, the one or more third optical components 511 may be manufactured using similar methods and similar materials as the one or more second optical components 503 (described above), such as by being waveguides and other structures formed at least in part through a deposition and patterning process. However, any suitable structures, materials and any suitable methods of manufacture may be utilized.

Figure 6:
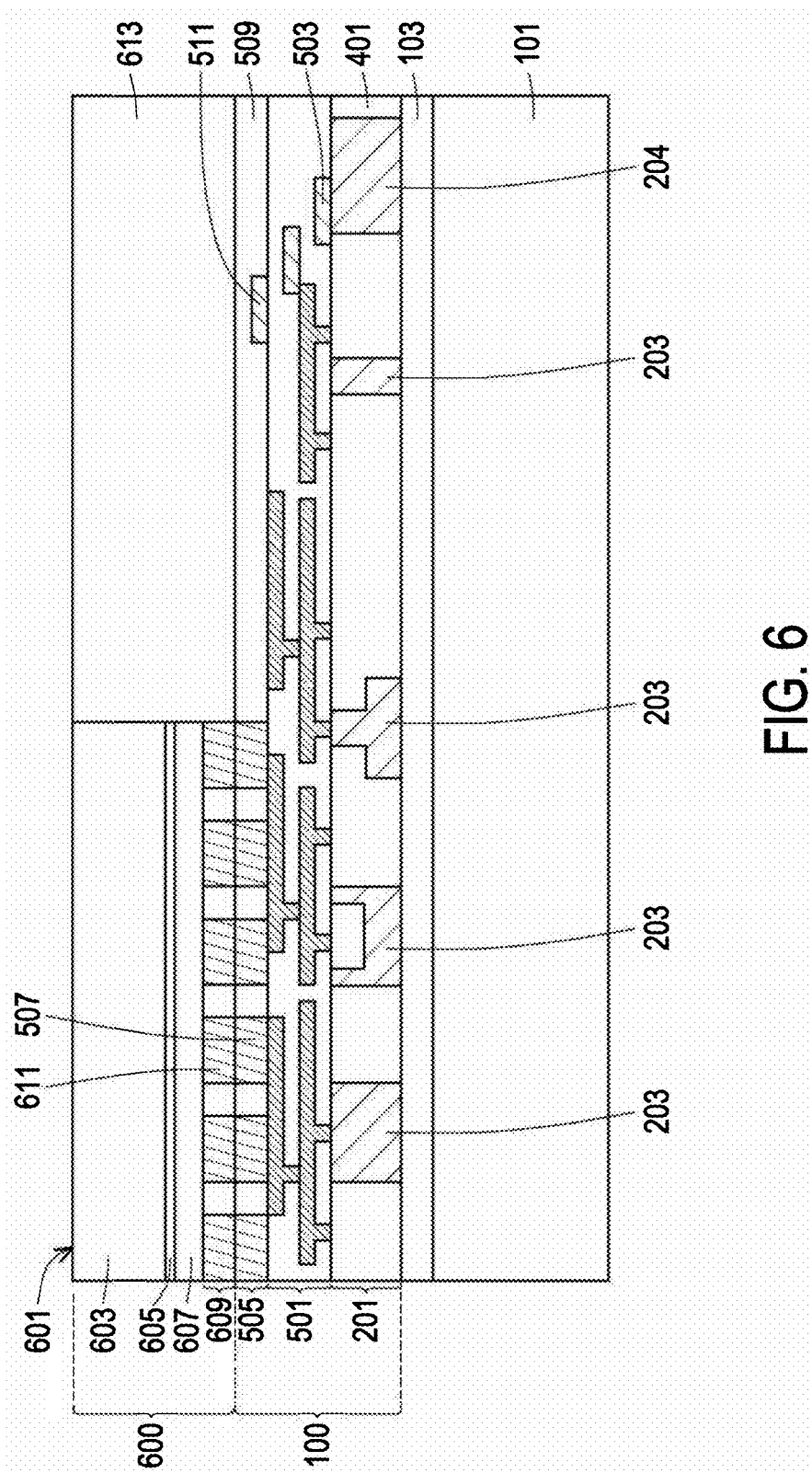

FIG. 6 illustrates a bonding of a first semiconductor device 601 to the first bonding layer 505 of the optical interposer 100. In some embodiments, the first semiconductor device 601 is an electronic integrated circuit (EIC—e.g., a device without optical devices) and may have a semiconductor substrate 603, a layer of active devices 605, an overlying interconnect structure 607, a second bonding layer 609, and associated third bond pads 611. In an embodiment the semiconductor substrate 603 may be similar to the first substrate 101 (e.g., a semiconductor material such as silicon or silicon germanium), the active devices 605 may be transistors, capacitors, resistors, and the like formed over the semiconductor substrate 603, the interconnect structure 607 may be similar to the first metallization layers 501 (without optical components), the second bonding layer 609 may be similar to the first bonding layer 505, and the third bond pads 611 may be similar to the first bond pads 507. However, any suitable devices may be utilized.

In an embodiment the first semiconductor device 601 may be configured to work with the optical interposer 100 for a desired functionality. In some embodiments the first semiconductor device 601 may be a high bandwidth memory (HBM) module, an xPU, a logic die, a 3DIC die, a CPU, a GPU, a SoC die, a MEMS die, combinations of these, or the like. Any suitable device with any suitable functionality, may be used, and all such devices are fully intended to be included within the scope of the embodiments.

In an embodiment the first semiconductor device 601 and the first bonding layer 505 may be bonded using a dielectric-to-dielectric and metal-to-metal bonding process. In a particular embodiment which utilizes a dielectric-to-dielectric and metal-to-metal bonding process, the process may be initiated by activating the surfaces of the second bonding layer 609 and the surfaces of the first bonding layer 505. Activating the top surfaces of the first bonding layer 505 and the second bonding layer 609 may comprise a dry treatment, a wet treatment, a plasma treatment, exposure to an inert gas plasma, exposure to $H_2$, exposure to $N_2$, exposure to $O_2$, combinations thereof, or the like, as examples. In embodiments where a wet treatment is used, an RCA cleaning may be used, for example. In another embodiment, the activation process may comprise other types of treatments. The activation process assists in the bonding of the first bonding layer 505 and the second bonding layer 609.

After the activation process the optical interposer 100 and the first semiconductor device 601 may be cleaned using, e.g., a chemical rinse, and then the first semiconductor device 601 is aligned and placed into physical contact with the optical interposer 100. The optical interposer 100 and the first semiconductor device 601 are subjected to thermal treatment and contact pressure to bond the optical interposer 100 and a laser die 600. For example, the optical interposer 100 and the first semiconductor device 601 may be subjected to a pressure of about 200 kPa or less, and a temperature between about 25° C. and about 250° C. to fuse the optical interposer 100 and the first semiconductor device 601. The optical interposer 100 and the first semiconductor device 601 may then be subjected to a temperature at or above the eutectic point for material of the first bond pads 507 and the third bond pads 611, e.g., between about 150° C. and about 650° C., to fuse the metal. In this manner, the optical interposer 100 and the first semiconductor device 601 forms a dielectric-to-dielectric and metal-to-metal bonded device. In some embodiments, the bonded dies are subsequently baked, annealed, pressed, or otherwise treated to strengthen or finalize the bond.

Additionally, while specific processes have been described to initiate and strengthen the bonds, these descriptions are intended to be illustrative and are not intended to be limiting upon the embodiments. Rather, any suitable combination of baking, annealing, pressing, or combination of processes may be utilized. All such processes are fully intended to be included within the scope of the embodiments.

FIG. 6 additionally illustrates that, once the first semiconductor device 601 has been bonded, a second gap-fill material 613 is deposited in order to fill the space around the first semiconductor device 601 and provide additional support. In an embodiment the second gap-fill material 613 may be a material such as silicon oxide, silicon nitride, silicon oxynitride, combinations of these, or the like, deposited to fill and overfill the spaces around the first semiconductor device 601. However, any suitable material and method of deposition may be utilized.

Once the second gap-fill material 613 has been deposited, the second gap-fill material 613 may be planarized in order to expose the first semiconductor device 601. In an embodiment the planarization process may be a chemical mechanical planarization process, a grinding process, or the like. However, any suitable planarization process may be utilized.

Figure 7:
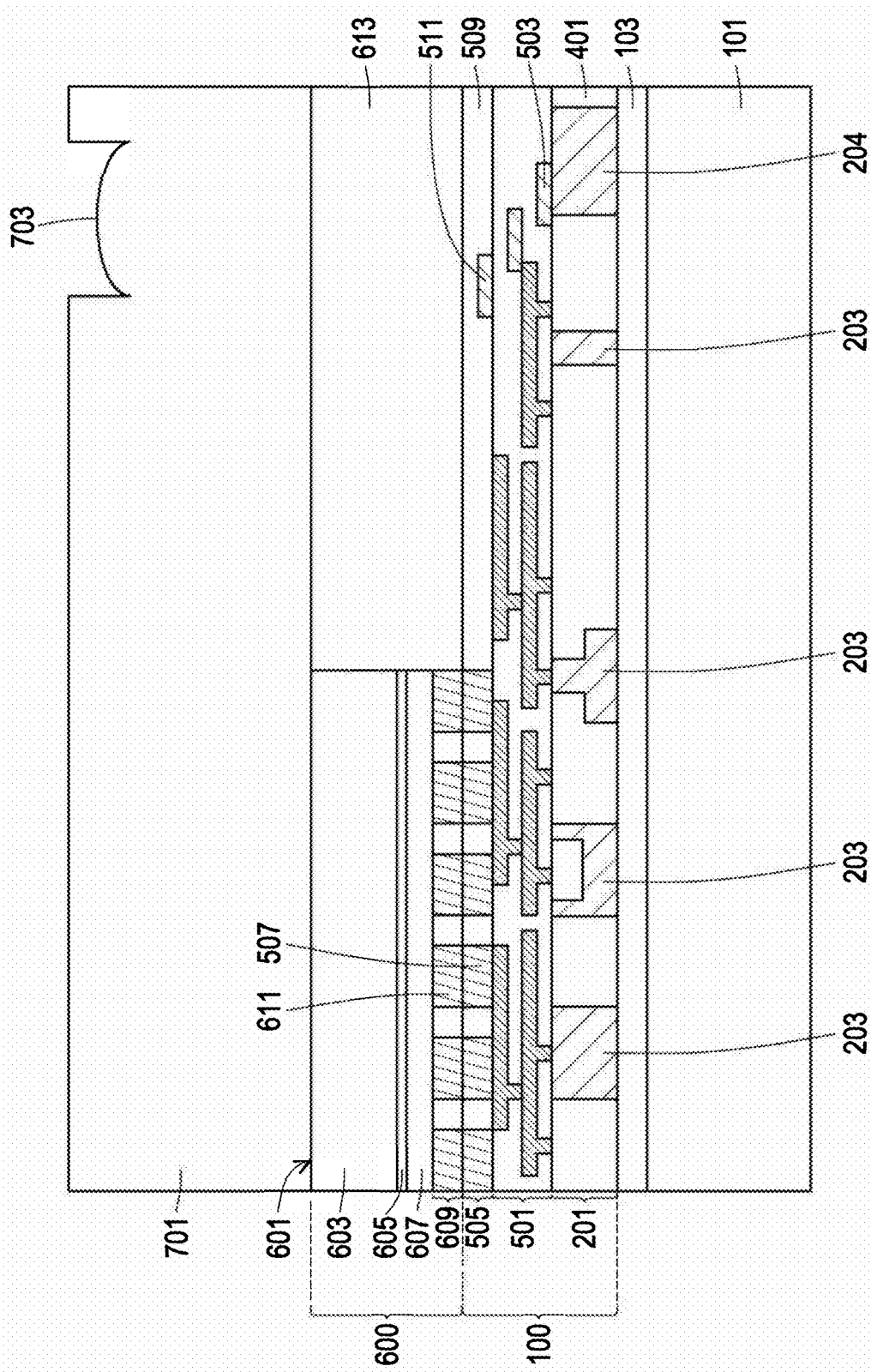

FIG. 7 illustrates an attachment of a support substrate 701 to the first semiconductor device 601 and the second gap-fill material 613. In an embodiment the support substrate 701 may be a support material that is transparent to the wavelength of light that is desired to be used, such as silicon, and may be attached using, e.g., an adhesive (not separately illustrated in FIG. 7). However, in other embodiments the support substrate 701 may be bonded to the first semiconductor device 601 and the second gap-fill material 613 using, e.g., a bonding process. Any suitable method of attaching the support substrate 701 may be used.

FIG. 7 additionally illustrates the support substrate 701 comprises a coupling lens 703 positioned to facilitate movement from an optical fiber 905 (not illustrated in FIG. 7 but illustrated and described further below with respect to FIG. 9) to the grating coupler 204, the second optical components 503 of the first metallization layers 501, or the third optical components 511. In an embodiment the coupling lens 703 may be formed by shaping the material of the support substrate (e.g., silicon) using masking and etching processes. However, any suitable process may be utilized.

Figure 8:
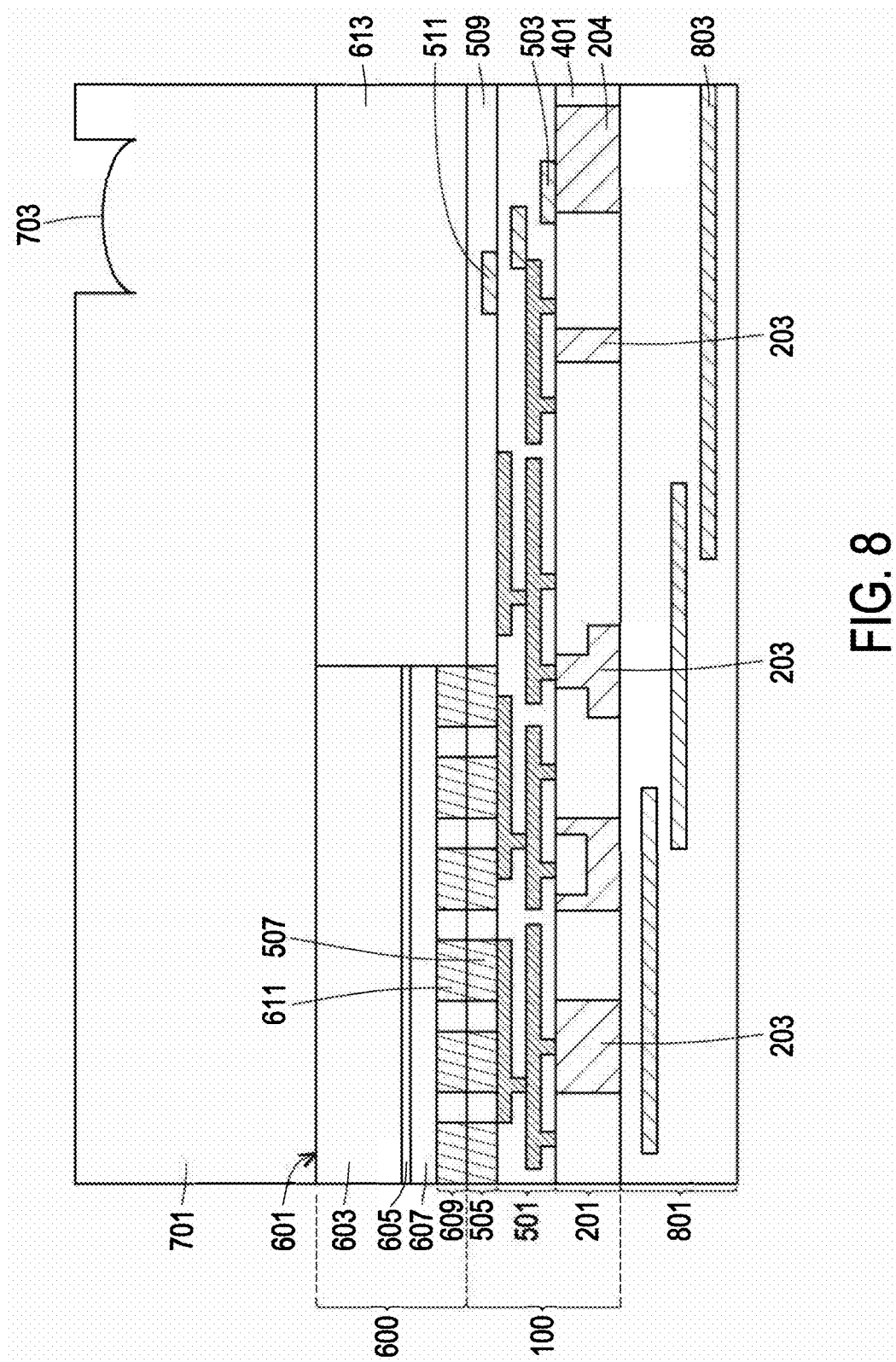

FIG. 8 illustrates a removal of the first substrate 101 and, optionally, the first insulator layer 103, thereby exposing the first active layer 201 of first optical components 203 and the grating coupler 204. In an embodiment the first substrate 101 and the first insulator layer 103 may be removed using a planarization process, such as a chemical mechanical polishing process, a grinding process, one or more etching processes, combinations of these, or the like. However, any suitable method may be used in order to remove the first substrate 101 and/or the first insulator layer 103.

Once the first substrate 101 and the first insulator layer 103 have been removed, a second active layer 801 of fourth optical components 803 may be formed on a back side of the first active layer 201. In an embodiment the second active layer 801 of fourth optical components 803 may be formed using similar materials and similar processes as the second optical components 503 of the first metallization layers 501 (described above with respect to FIG. 5). For example, the second active layer 801 of fourth optical components 803 may be formed of alternating layers of a cladding material such as silicon oxide and core material such as silicon nitride formed using deposition and patterning processes in order to form optical components such as waveguides and the like.

FIG. 9 illustrates formation of first through device vias (TDVs) 901, formation of a third bonding layer 903, and placement of an optical fiber 905 to form a first optical package 900. In an embodiment the first through device vias 901 extend through the second active layer 801 and the first active layer 201 so as to provide a quick passage of power, data, and ground through the optical interposer 100. In an embodiment the first through device vias 901 may be formed by initially forming through device via openings into the optical interposer 100. The through device via openings may be formed by applying and developing a suitable photoresist (not shown), and removing portions of the second active layer 801 and the optical interposer 100 that are exposed.

Once the through device via openings have been formed within the optical interposer 100, the through device via openings may be lined with a liner. The liner may be, e.g., an oxide formed from tetraethylorthosilicate (TEOS) or silicon nitride, although any suitable dielectric material may alternatively be used. The liner may be formed using a plasma enhanced chemical vapor deposition (PECVD) process, although other suitable processes, such as physical vapor deposition or a thermal process, may also be used.

Once the liner has been formed along the sidewalls and bottom of the through device via openings, a barrier layer (also not independently illustrated) may be formed and the remainder of the through device via openings may be filled with first conductive material. The first conductive material may comprise copper, although other suitable materials such as aluminum, alloys, doped polysilicon, combinations thereof, and the like, may be utilized. The first conductive material may be formed by electroplating copper onto a seed layer (not shown), filling and overfilling the through device via openings. Once the through device via openings have been filled, excess liner, barrier layer, seed layer, and first conductive material outside of the through device via openings may be removed through a planarization process such as chemical mechanical polishing (CMP), although any suitable removal process may be used.

Optionally, in some embodiments once the first through device vias 901 have been formed, second metallization layers (not separately illustrated in FIG. 9) may be formed in electrical connection with the first through device vias 901. In an embodiment the second metallization layers may be formed as described above with respect to the first metallization layers 501, such as being alternating layers of dielectric and conductive materials using damascene processes, dual damascene process, or the like. In other embodiments, the second metallization layers may be formed using a plating process to form and shape conductive material, and then cover the conductive material with a dielectric material. However, any suitable structures and methods of manufacture may be utilized.

The third bonding layer 903 is formed in order to provide electrical connections between the optical interposer 100 and subsequently attached devices. In an embodiment the third bonding layer 903 may be similar to the first bonding layer 505, such as having third bond pads 909 (similar to the first bond pads 507) and even fifth optical components 911 (similar to the third optical components 511). However, any suitable devices may be utilized.

Optionally at this point in the process, an optical fiber 905 may be attached. In an embodiment the optical fiber 905 is utilized as an optical input/output port to the optical interposer 100. In an embodiment the optical fiber 905 is placed so as to optically couple the optical fiber 905 and an optical input such as a grating coupler (not separately illustrated in FIG. 9) that is part of the first optical components 203, the second optical components 503, or the third optical components 511. By positioning the optical fiber 905 as such, optical signals leaving the optical fiber 905 are directed towards, e.g., the first active layer 201 of first optical components 203 and the grating coupler 204. Similarly, the optical fiber 905 is positioned so that optical signals leaving the first active layer 201 of first optical components 203 is directed into the optical fiber 905 for transmission. However, any suitable location may be utilized.

The optical fiber 905 may be held in place using, e.g., an optical glue 907. In some embodiments, the optical glue 907 comprises a polymer material such as epoxy-acrylate oligomers, and may have a refractive index between about 1 and about 3. However, any suitable material may be utilized.

Additionally, while the optical fiber 905 is illustrated as being attached at this point in the manufacturing process, this is intended to be illustrative and is not intended to be limiting. Rather, the optical fiber 905 may be attached at any suitable point in the process. Any suitable point of attachment may be utilized, and all such attachments at any point in the process are fully intended to be included within the scope of the embodiments.

By utilizing the structures and methods presented herein, bidirectional reflectors can be applied to a grating coupler that can be integrated into a silicon photonics platform, in which the grating coupler can achieve higher coupling efficiency. Additionally, the bidirectional reflectors, e.g., the backside reflector layer 260 and the receiving reflector layer 265, can provide effective confinement and concentration of optical energy. For example, by utilizing the properties of a dual-layer metallic reflector, e.g., the backside reflector layer 260 and the receiving reflector layer 265, the optical beam can be effectively confined and concentrated, making it more focused and powerful. The bidirectional reflectors, e.g., the backside reflector layer 260 and the receiving reflector layer 265, can provide multiple reflections that can improve coupling and collection efficiency for the grating coupler 204. With the multiple reflection mechanism of the backside reflector layer 260, the reflected optical signal from the bottom can be reutilized to enhance the coupling and collection efficiency of the optical signals, resulting in higher efficiency of optical signal collection and coupling. Further, the bidirectional reflectors, e.g., the backside reflector layer 260 and the receiving reflector layer 265, can provide improved efficiency in optical communication systems. In some embodiments, the optical communication systems described herein, can use the dual-layer metallic reflector, e.g., the backside reflector layer 260 and the receiving reflector layer 265, to effectively focus the optical signal beam to the entrance of the grating coupler, improving the coupling efficiency and collection efficiency for the optical signal, thereby increasing the efficiency of the light receiver and transmitter. This can lead to higher transmission rates and suitability for use with longer transmission distances. The use of the dual-layer metallic reflector is not limited to grating couplers, but can also be widely applied to other optical components.

In some embodiments, a method of forming an optical device comprising forming a first reflector layer; forming a cladding layer on the first reflector layer; forming a grating layer on the cladding layer; and forming a second reflector layer on the cladding layer, wherein the second reflector layer comprises an opening for receiving optical signal to at least the grating layer. In an embodiment, forming the second reflector layer comprises depositing a metal layer over the grating layer; forming an etch mask on the metal layer patterned to expose an opening portion of the metal layer; and etching the opening portion of the metal layer to form the opening for receiving the optical signal to at least the grating layer. In an embodiment, the opening of the second reflector layer is present on a first side of a grating coupler of the optical device for the receiving of optical signal from an optical fiber, the first side of the grating coupler opposite a second side of the grating coupler, wherein the second side of the grating coupler includes a waveguide interface portion. In an embodiment, the grating layer is a single material layer. In an embodiment, the single material layer that provides the grating layer includes bidirectional gratings. In an embodiment, the grating layer is a multilayered structure. In an embodiment, the multilayered structure includes a first grating layer present on the cladding layer and a second grating layer present on the first grating layer, the first grating layer including a broadband set of gratings having a height extending into trenches formed in the cladding layer, the second grating layer having a first set of gratings extending in a first direction and a second set of gratings extending in a second direction.

In another embodiment, an optical device comprising a backside reflector layer; a cladding layer on the backside reflector layer; a grating structure on the backside reflector layer; and a receiving reflector layer on the grating structure, wherein the receiving reflector layer comprises an opening for receiving optical signal to at least the grating structure. In an embodiment, the opening in the receiving reflector layer is present on a first side of a grating coupler for the optical device for the receiving of optical signal from an optical fiber, the first side of the grating coupler opposite a second side of the grating coupler, the second side of the grating coupler including a waveguide interface portion. In some embodiments, the second side of the grating coupler has a narrower width than the first side of the grating coupler. In an embodiment, the cladding layer on the backside reflector layer is a first cladding structure, wherein a second cladding structure is present between the receiving reflector layer and the grating structure. In an embodiment, the grating structure is a single layer that includes a single set of gratings having a height extending towards the receiving reflector layer. In an embodiment, the grating structure includes a first set of gratings extending in a first direction and a second set of gratings extending in a second direction in a second portion of the grating structure. In an embodiment, the grating structure is a single layer that includes gratings having a reducing tapered width towards a waveguide joining portion. In one embodiment, the grating structure includes two layers.

In another embodiment, an optical device comprising a backside reflector layer; a cladding layer on the backside reflector layer; a multilayer grating structure on the backside reflector layer; and a receiving reflector layer on the multilayer grating structure, wherein the receiving reflector layer comprises an opening for receiving optical signal to at least the single layer grating layer. In some embodiments, the opening in the receiving reflector layer is present on a first side of a grating coupler for the optical device for the receiving of optical signal from an optical fiber, the first side of the grating coupler opposite a second side of the grating coupler, the second side of the grating coupler including a waveguide interface portion. In some embodiments, the second side of the grating coupler has a narrower width than the first side of the grating coupler. In an embodiment, the cladding layer on the backside reflector layer is a first cladding structure, wherein a second cladding structure is present between the receiving reflector layer and the single layer grating structure. In an embodiment, the multilayer grating structure comprises a first grating layer present on a cladding layer, the first grating layer having a plurality of trenches; and a second grating layer present on the first grating layer, the second grating layer having a first set of gratings on an upper surface of the second grating layer and a second set of gratings on a lower surface of the second grating layer that interfaces with the first grating layer, wherein the first set of gratings have a height that extends in a first direction, and the second set of gratings extend in a second direction into the plurality of trenches in the first grating layer. In an embodiment, the optical device further comprises a third set of gratings at an interface of the first grating layer and the cladding layer. In an embodiment, the multilayer grating structure has a reducing tapered width towards a waveguide joining portion.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming an optical device comprising:
   forming a first reflector layer;
   forming a cladding layer on the first reflector layer;
   forming a grating layer on the cladding layer; and
   forming a second reflector layer on the cladding layer, wherein the second reflector layer comprises an opening.

2. The method of claim 1, wherein forming the second reflector layer comprises:
   depositing a metal layer over the grating layer;
   forming an etch mask on the metal layer patterned to expose an opening portion of the metal layer; and
   etching the opening portion of the metal layer to form the opening.

3. The method of claim 1, wherein the opening of the second reflector layer is present on a first side of a grating coupler for the optical device, the first side of the grating coupler opposite a second side of the grating coupler, the second side of the grating coupler including a waveguide interface portion, and the second side of the grating coupler having a narrower width than the first side of the grating coupler.

4. The method of claim 1, wherein the grating layer is a single material layer.

5. The method of claim 4, wherein the single material layer includes bidirectional gratings.

6. The method of claim 1, wherein the grating layer is a multilayered structure.

7. The method of claim 6, wherein the multilayered structure includes a first grating layer present on the cladding layer and a second grating layer present on the first grating layer, the first grating layer including a broadband set of gratings having a height extending into trenches formed in the cladding layer, the second grating layer having a first set of gratings extending in a first direction and a second set of gratings extending in a second direction different from the first direction.

8. An optical device comprising:
   a backside reflector layer;
   a cladding layer on the backside reflector layer;
   a grating structure on cladding layer; and
   a receiving reflector layer on the grating structure, wherein the receiving reflector layer comprises an opening.

9. The optical device of claim 8, wherein the opening in the receiving reflector layer is present on a first side of a grating coupler for the optical device, the first side of the grating coupler opposite a second side of the grating coupler, the second side of the grating coupler including a waveguide interface portion.

10. The optical device of claim 8, wherein the cladding layer on the backside reflector layer is a first cladding structure, wherein a second cladding structure is present between the receiving reflector layer and the grating structure.

11. The optical device of claim 8, wherein the grating structure is a single layer that includes a single set of gratings having a height extending towards the receiving reflector layer.

12. The optical device of claim 8, wherein the grating structure is a single layer that includes a first set of gratings extending in a first direction and a second set of gratings extending in a second direction in a second portion of the grating structure.

13. The optical device of claim 8, wherein the grating structure is a single layer that includes gratings having a reducing tapered width towards a waveguide joining portion.

14. The optical device of claim 8, wherein the grating structure includes two layers.

15. An optical device comprising:
a backside reflector layer;
a cladding layer on the backside reflector layer;
a multilayer grating structure on the cladding layer; and
a receiving reflector layer on the multilayer grating structure, wherein the receiving reflector layer comprises an opening.

16. The optical device of claim 15, wherein the opening in the receiving reflector layer is present on a first side of a grating coupler for the optical device, the first side of the grating coupler opposite a second side of the grating coupler, the second side of the grating coupler including a waveguide interface portion and having a narrower width than the first side of the grating coupler.

17. The optical device of claim 15, wherein the cladding layer on the backside reflector layer is a first cladding structure, wherein a second cladding structure is present between the receiving reflector layer and the multilayer grating structure.

18. The optical device of claim 15, wherein the multilayer grating structure comprises:
a first grating layer present on a cladding layer, the first grating layer having a plurality of trenches; and
a second grating layer present on the first grating layer, the second grating layer having a first set of gratings on an upper surface of the second grating layer and a second set of gratings on a lower surface of the second grating layer that interfaces with the first grating layer, wherein the first set of gratings have a height that extends in a first direction, and the second set of gratings extend in a second direction into the plurality of trenches in the first grating layer.

19. The optical device of claim 18, further comprising a third set of gratings at an interface of the first grating layer and the cladding layer.

20. The optical device of claim 18, wherein the multilayer grating structure has a reducing tapered width towards a waveguide joining portion.

\* \* \* \* \*